United States Patent
Bates

(10) Patent No.: US 10,453,272 B2
(45) Date of Patent: Oct. 22, 2019

(54) TIME-WARPING ADJUSTMENT BASED ON DEPTH INFORMATION IN A VIRTUAL/AUGMENTED REALITY SYSTEM

(71) Applicant: Google Inc., Mountain View, CA (US)

(72) Inventor: John Paul Bates, Redwood City, CA (US)

(73) Assignee: Google LLC, Mountain View, CA (US)

( * ) Notice: Subject to any disclaimer, the term of this patent is extended or adjusted under 35 U.S.C. 154(b) by 74 days.

(21) Appl. No.: 15/606,569

(22) Filed: May 26, 2017

(65) Prior Publication Data

US 2017/0345220 A1   Nov. 30, 2017

Related U.S. Application Data

(60) Provisional application No. 62/342,999, filed on May 29, 2016, provisional application No. 62/354,443, filed on Jun. 24, 2016.

(51) Int. Cl.
*G06T 15/00* (2011.01)
*G06T 19/20* (2011.01)
(Continued)

(52) U.S. Cl.
CPC ............ *G06T 19/20* (2013.01); *G02B 27/017* (2013.01); *G06F 3/012* (2013.01); *G06T 3/0093* (2013.01);
(Continued)

(58) Field of Classification Search
CPC ......... G06T 17/20; G06T 19/00; G06T 17/00; G06T 15/10; G06T 15/00
See application file for complete search history.

(56) References Cited

U.S. PATENT DOCUMENTS 6,008,820 A    12/1999   Chauvin et al.
8,320,621 B2 *  11/2012   McEldowney ........ G03B 17/54
                                                356/5.01
(Continued)

FOREIGN PATENT DOCUMENTS

WO       2017/210111 A1    12/2017

OTHER PUBLICATIONS

Pasman, W., etc. "Low Latency Rendering and Positioning forMobile Augmented Reality", [online], [Retrieved on Oct. 15, 2018], Retrieved from the Internet <URL: https://pdfs.semanticscholar.org/87ab/2767e2861a343a1ea4fd521f681b83b034d4.pdf>.*

(Continued)

*Primary Examiner* — Gordon G Liu
(74) *Attorney, Agent, or Firm* — Brake Hughes Bellermann LLP

(57) ABSTRACT

A technique includes determining a depth value for each of a plurality of pixels of a frame, down-sampling the depth values of a tile of the frame to obtain a plurality of down-sampled depth values, the frame including one or more tiles, determining a change in a head pose, determining, from the plurality of down-sampled depth values, a down-sampled depth value for a vertex, determining an adjusted position for the vertex based on the change in head pose and the down-sampled depth value for the vertex, performing, based on at least the adjusted position for the vertex, a depth-adjusted time-warping of the frame to obtain a depth-adjusted time-warped frame, and triggering display of the depth-adjusted time-warped frame.

20 Claims, 10 Drawing Sheets

(51) Int. Cl.

| | |
|---|---|
| G06T 7/50 | (2017.01) |
| G06F 3/01 | (2006.01) |
| G06T 3/00 | (2006.01) |
| G06T 5/00 | (2006.01) |
| G06T 15/20 | (2011.01) |
| G02B 27/01 | (2006.01) |
| H04N 13/344 | (2018.01) |
| H04N 13/279 | (2018.01) |
| H04N 13/366 | (2018.01) |
| H04N 13/128 | (2018.01) |
| H04N 13/383 | (2018.01) |
| H04N 13/00 | (2018.01) |

(52) U.S. Cl.
CPC .............. *G06T 5/006* (2013.01); *G06T 7/50* (2017.01); *G06T 15/005* (2013.01); *G06T 15/205* (2013.01); *H04N 13/128* (2018.05); *H04N 13/279* (2018.05); *H04N 13/344* (2018.05); *H04N 13/366* (2018.05); *H04N 13/383* (2018.05); *G06T 2207/10028* (2013.01); *G06T 2219/2004* (2013.01); *G06T 2219/2016* (2013.01); *H04N 2013/0081* (2013.01)

(56) References Cited

U.S. PATENT DOCUMENTS

| | | | |
|---|---|---|---|
| 9,240,069 B1* | 1/2016 | Li | G06T 15/00 |
| 2010/0197390 A1* | 8/2010 | Craig | G06K 9/00369 |
| | | | 463/30 |
| 2013/0057644 A1 | 3/2013 | Stefanoski et al. | |
| 2014/0098096 A1* | 4/2014 | Bavoil | G06T 15/04 |
| | | | 345/422 |

OTHER PUBLICATIONS

"Oculus Mobile Development Documentation", Oculus CR, LLC, version 1.0.0.1, 2016, 134 pages.
"Oculus Unity Developer Guide", Oculus VR, LLC, 2015, 41 pages.
Evangelakos, et al., "Extended TimeWarp Latency Compensation for Virtual Reality", Proceedings of the 20th ACM SIGGRAPH Symposium on Interactive 3D Graphics and Games, 2016, pp. 193-194.
Senin, "Dynamic Time Warping Algorithm Review", Information and Computer Science Department, University of Hawaii at Manoa, Dec. 2008, 23 pages.
Smit, et al., "A Shared-Scene-Graph Image-Warping Architecture for VR: Low Latency Versus Image Quality", Computers & Graphics 34, Issue 1, 2010, pp. 3-16.
Van Waveren, "The asynchronous time warp for virtual reality on consumer hardware", VRST '16, Proceedings of the 22nd ACM Conference on Virtual Reality Software and Technology, Nov. 2-4, 2016, pp. 37-46.
Yang, et al., "Image-Based Bidirectional Scene Reprojection", ACM Transactions on Graphics (TOG)—Proceedings of ACM SIGGRAPH Asia 2011, vol. 30, Issue 6, Article No. 150, Dec. 2011, 10 pages.
International Search Report and Written Opinion for PCT Patent Application No. PCT/US2017/034689, dated Aug. 8, 2017, 15 pages.
Pasman et al., "Low Latency Rendering and Positioning for Mobile Augmented Reality", Proceedings of Vision, Modeling, and Visualisation, 1999, 7 pages.
International Preliminary Report on Patentability for International Application No. PCT/US2017/034689, dated Dec. 13, 2018, 11 pages.

* cited by examiner

US 10,453,272 B2

TIME-WARPING ADJUSTMENT BASED ON DEPTH INFORMATION IN A VIRTUAL/AUGMENTED REALITY SYSTEM

CROSS REFERENCE TO RELATED APPLICATIONS

This application claims priority to U.S. Provisional Application No. 62/342,999, filed on May 29, 2016, and claims priority to U.S. Provisional Application No. 62/354,443, filed on Jun. 24, 2016, the disclosures of which are incorporated herein by reference in their entireties.

FIELD

This document relates, generally, to a virtual or augmented reality system.

BACKGROUND

Performing video rendering can consume a significant amount of time and computing resources in a virtual reality (VR) environment. Video rendering may include, for example, a process by which a computer processes information from a coded data source and uses that information to produce and display an image or series of images. A virtual reality application may receive or generate application data. A graphics or rendering engine may then render a frame to be displayed as part of the virtual reality content. In some cases, while the graphics engine is rendering graphics for a frame, a user's head or VR headset (or head mounted display) may move, causing the location/orientation information for the user's head to be inaccurate by the time the frame is output to the display.

SUMMARY

In one aspect, a method, may include determining a depth value for each of a plurality of pixels of a frame, down-sampling the depth values of a tile of the frame to obtain a plurality of down-sampled depth values, the frame including one or more tiles, determining a change in a head pose, determining, from the plurality of down-sampled depth values, a down-sampled depth value for a vertex, determining an adjusted position for the vertex based on the change in head pose and the down-sampled depth value for the vertex, performing, based on at least the adjusted position for the vertex, a depth-adjusted time-warping of the frame to obtain a depth-adjusted time-warped frame, and triggering display of the depth-adjusted time-warped frame.

An apparatus may include at least one processor and at least one memory including computer instructions, when executed by the at least one processor, cause the apparatus to: determine a depth value for each of a plurality of pixels of a frame, down-sample the depth values of a tile of the frame to obtain a plurality of down-sampled depth values, the frame including one or more tiles, determine a change in a head pose, determining, from the plurality of down-sampled depth values, a down-sampled depth value for a vertex, determine an adjusted position for the vertex based on the change in head pose and the down-sampled depth value for the vertex, perform, based on at least the adjusted position for the vertex, a depth-adjusted time-warping of the frame to obtain a depth-adjusted time-warped frame, and trigger display of the depth-adjusted time-warped frame.

A computer program product may include a non-transitory computer-readable storage medium and storing executable code that, when executed by at least one data processing apparatus, is configured to cause the at least one data processing apparatus to perform a method including: determining a depth value for each of a plurality of pixels of a frame, down-sampling the depth values of a tile of the frame to obtain a plurality of down-sampled depth values, the frame including one or more tiles, determining a change in a head pose, determining, from the plurality of down-sampled depth values, a down-sampled depth value for a vertex, determining an adjusted position for the vertex based on the change in head pose and the down-sampled depth value for the vertex, performing, based on at least the adjusted position for the vertex, a depth-adjusted time-warping of the frame to obtain a depth-adjusted time-warped frame, and triggering display of the depth-adjusted time-warped frame.

The details of one or more embodiments are set forth in the accompanying drawings and the description below. Other features will be apparent from the description and drawings, and from the claims.

DETAILED DESCRIPTION

Figure 1:
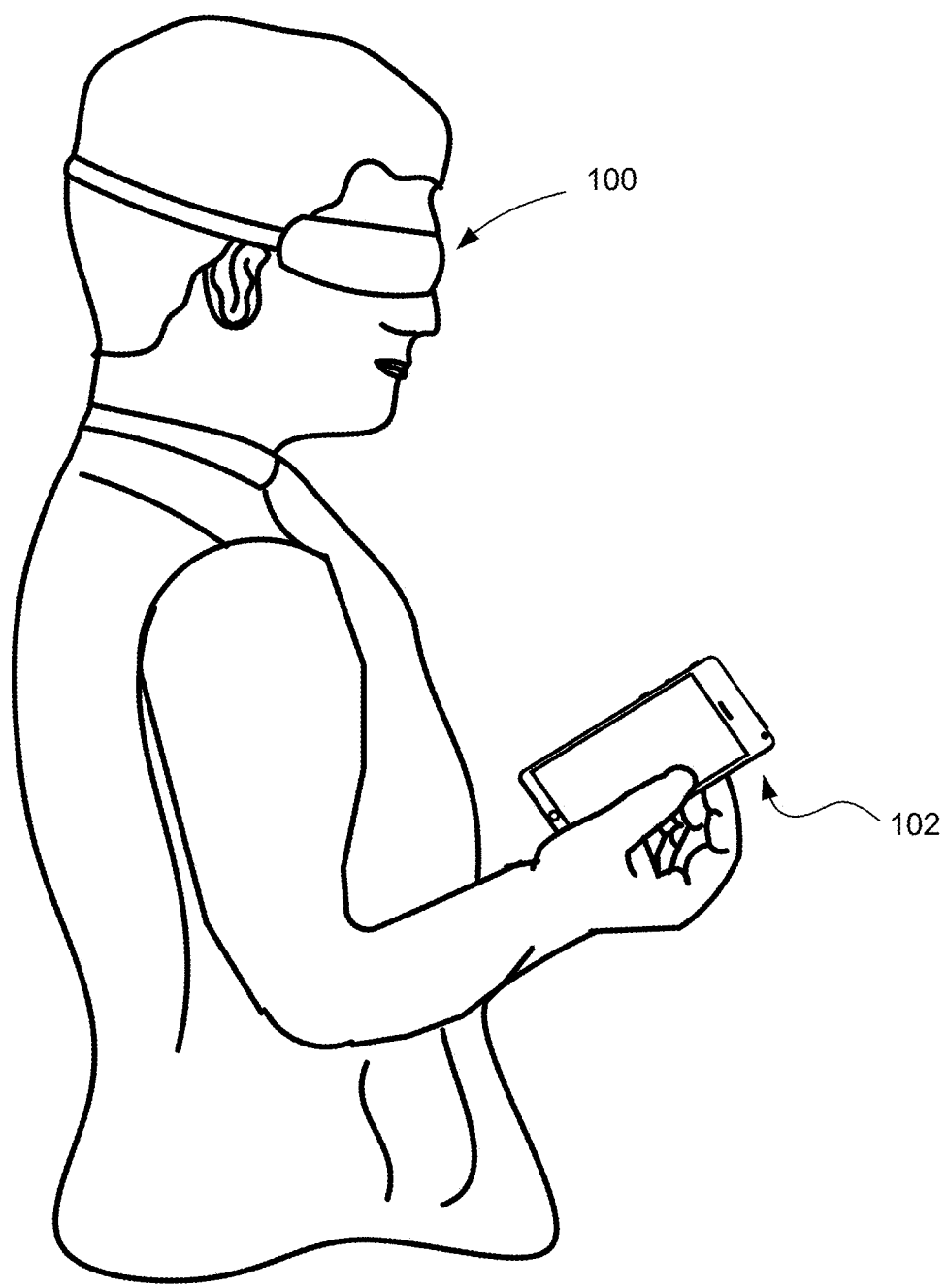
FIG. 1 is an example embodiment of a virtual reality system.

According to an illustrative example embodiment, virtual reality, which may also be referred to as immersive multimedia or computer-simulated life, may, at least in some cases, replicate or simulate, to varying degrees, an environment or physical presence in places in the real world or imagined worlds or environments. A Virtual Reality (VR) system and/or an Augmented Reality (AR) system may include, for example, a head-mounted audio visual device, such as, for example, a VR headset, a head mounted display (HMD) device, or similar device worn by a user, for example, on a head of the user, to generate an immersive virtual world environment to be experienced by the user. For example, a VR/AR system may generate a three-dimensional (3D) immersive virtual environment. A user may experience this 3D immersive virtual environment through interaction with various electronic devices.

A sensing system may track the pose of the VR headset or user's head. Pose, may include, for example, position (or location) and/or orientation information for any object (physical or virtual), such as a VR controller (as an example). Pose may include, for example, absolute or relative position, location and/or orientation of an object within a physical world or of an object (e.g., virtual object or rendered element) within a virtual world. A graphics engine (or graphics processing unit (GPU)) may be used to render graphics of the VR content for display based on a current pose of the VR headset or user's head. In some cases, while the graphics engine is rendering a frame, a user's head or VR headset may move, causing the location/orientation information for the user's head pose to be inaccurate by the time the frame is output to the display.

According to an example embodiment, time-warping may be used to warp (e.g., shift, rotate, adjust or reproject) an image or frame to correct for head motion or translation (change in the user's head pose) that occurred after (or while) the frame (or texture or image) was rendered and thereby reduce perceived latency. For example, a homograph warp may use homography transformation of the image to rotate the image based on post-rendering pose information. Time-warp may include a synchronous time-warp or an asynchronous time-warp. Also, time-warping may include rotational time-warping to adjust or shift an image due to rotation of a user's head, and positional time-warping to shift or adjust an image due to translation (or change in position or location) of the user's head. Thus, according to an example embodiment, time-warp may include a rotational time-warp component and a positional time-warp component due to change in position or location of a user/user's head. According to example implementation, time-warping, which may also be referred to as asynchronous reprojection or image warping, may include receiving an image that includes a 3D scene that has been projected to a plane, and then reprojecting the 3D scene, where the reprojection is the 2D image that has been modified (e.g., shifted, rotated, or other modification) based on the user's updated head pose or change in head pose.

Also, according to an example implementation, time-warping (which may also be referred to as image warping or reprojection) may be considered an image-based technique that generates new views from reference images by performing a per-pixel reprojection. In this way, the application frames can be transformed and re-projected for new object poses and camera viewpoints. See, e.g., Smit, F. A., et al., 2010, A Shared-Scene-Graph Image-Warping Architecture for VR: Low Latency Versus Image Quality, Computers & Graphics 34, Issue 1, Pages 3-16.

According to one or more example implementations, the technologies disclosed herein enable an improvement in user experience by, e.g., performing a depth-adjusted time-warping of an image to reduce perceived latency without overburdening hardware or system resources (e.g., without overburdening memory bandwidth, processor resources, and the like).

According to an example embodiment, in order to improve the 3D experience of a VR system, the amount of time-warping applied to an image (or portions thereof) may adjusted or scaled based on a depth of the image. For example, as a user turns his head or changes his/her location, objects in a frame that are closer to the user should shift or move more than objects that are farther away. According to an example embodiment, both a color value (e.g., indicating RGB/red green blue and alpha information for each pixel) and a depth value (e.g., indicating a depth or relative depth for a pixel) may be provided for each pixel of an image. Thus, according to an example embodiment, a per-pixel time-warping for a frame may be adjusted or scaled based on the depth value for each of the pixels of the frame.

According to an example embodiment, the color values and depth values for a frame may be initially stored in a local memory (or GPU memory) for processing by the GPU/graphics engine. At least in some systems, in order to perform time-warping on the frame, the color and depth information may be written from local (GPU) memory to main memory so that time-warping on the frame may be performed by another processor/process or controller. However, there is typically a very limited bandwidth between the local memory (e.g., GPU memory) and the main memory. Therefore, writing a large number of depth values for a frame out to a main memory for time-warp processing may add significant delay to the processing/rendering of a frame. Also, the amount of time to adjust or scale the time-warping for each pixel based on per-pixel depth values may typically significantly increase the amount of time or latency to perform the time-warping on the frame. Therefore, at least in some cases, due to such memory bandwidth constraints and/or processing limitations of many VR systems or HMDs, it may be impractical or at least technically challenging to adjust time-warping for each pixel of a frame based on depth values for each individual pixel of the frame. Alternatively, a single depth value may be used for the frame, and then the time-warping of the frame may be adjusted based on this single depth value for the frame. However, using a single depth value for a frame may over-simplify the depth of the frame, and thus, for example, may not sufficiently accommodate or reflect the depth of various objects in a frame when performing time-warping for the frame.

Therefore, according to an example embodiment, a graphics engine or GPU provided as part of a head mounted display (HMD) 100 (or as part of a first electronic device 300), for example, may determine a subset of depth values for a frame, where the subset of depth values may be, for example, greater than 1 depth value per frame, and less than a depth value for each (or all) pixels of a frame. Tile-based processing of depth values may be used to down-sample depth values of the tile to obtain a subset of down-sampled depth values, e.g., for each tile, where there may be one or more tiles per frame. In some cases, a full set of depth values for all pixels of a frame may be too large to be processed and down-sampled by a graphics engine/GPU. Hence, the graphics engine/GPU may perform down-sampling of depth values for each tile of a frame. Once a set of down-sampled depth values have been determined for each tile, these down-sampled depth values may be output from GPU/local memory to main memory, so that these subset of down-sampled depth values may be read or used by an electronic display stabilization (EDS) engine to perform depth-adjusted time-warping of the frame. By using a subset of depth values from a frame, time-warping of the frame may be improved for a VR system, e.g., while not introducing significant delay to the time-warp processing.

According to an example embodiment, a frame may include or may be divided into a plurality of tiles (or sections), and a depth value may be provided for each pixel. In an example implementation, the depth values for each tile may be down-sampled to obtain a subset of down-sampled depth values for the frame, including one or more depth values per tile. Also, according to an example embodiment, a frame may be divided into a plurality of polygons (e.g., rectangles, triangles), where a down-sampled depth value may be determined for each vertex of one or more of the polygons for the frame. For example, a coordinate position may be determined for the vertex. Then, the EDS device may determine, from the subset of down-sampled depth values, a down-sampled depth value that has a same (or overlapping) coordinate location as the vertex to be the down-sampled depth value for the vertex.

As noted, only a subset of down-sampled depth values are provided or determined for a frame, e.g., for each tile of the frame. One (or more) of these down-sampled depth values may be assigned to or determined for each vertex. According to an example implementation, rather than processing a separate depth value for each and every pixel of a frame to perform time-warping, a system may process the subset of down-sampled depth values, e.g., a depth value at/for each vertex, to perform a depth value adjusted time-warping of the frame. In this manner, a more effective and efficient depth-adjusted time-warping may be performed, e.g., which may reduce the computational load for such time-warping. An EDS device may then perform, based on at least the adjusted position of the vertex, a depth-adjusted time-warping of a frame. According to an example embodiment, an adjusted position (e.g., x', y') for a vertex may be determined based on a change in a user's head pose and the down-sampled depth value for (or at) the vertex. For example, an adjusted position may be determined for each vertex of a plurality (or group) of vertexes of a polygon. According to an example embodiment, in order to perform a depth-adjusted time-warping on the frame, an electronic display stabilization (EDS) device (for example) may, for each of one or more polygons of the frame, determine an adjusted position for one or more pixels within the polygon by interpolating between adjusted positions of a group of vertexes of the polygon.

Therefore, according to an example embodiment, a technique may include determining a depth value for each of a plurality of pixels of a frame, down-sampling the depth values of a tile of the frame to obtain a plurality of down-sampled depth values, the frame including one or more tiles, determining a change in a head pose, determining, from the plurality of down-sampled depth values, a down-sampled depth value for a vertex, determining an adjusted position for the vertex based on the change in head pose and the down-sampled depth value for the vertex, performing, based on at least the adjusted position for the vertex, a depth-adjusted time-warping of the frame to obtain a depth-adjusted time-warped frame, and triggering display of the depth-adjusted time-warped frame.

In the example embodiment shown in FIG. 1, a user may wear a head-mounted audio visual device, such as, for example, a head mounted display (HMD) 100. As shown in FIG. 1, the user wearing HMD 100 is holding a portable, or handheld, electronic device 102, such as, for example, a smartphone, or other portable handheld electronic device (or electronic handheld controller) that may be paired with, or operably coupled with, and communicate with, the HMD 100 via, for example, a wired connection, or a wireless connection such as, for example, a Wi-Fi or Bluetooth connection, or other wireless connection. This pairing, or operable coupling, may provide for communication and exchange of data between the handheld electronic device 102 and the HMD 100, so that the handheld electronic device 102 may function as a controller (e.g., handheld controller) in communication with the HMD 100 for interacting in the immersive virtual world experience generated by the HMD 100. In the example shown in FIG. 1, the user is holding the handheld electronic device 102 with his right hand. However, the user may also hold the handheld electronic device 102 in his left hand, or in both his left hand and his right hand, and still interact with the immersive virtual world experience generated by the HMD 100. As noted, the user wears the HMD 100 (as an example of a head-mounted audio visual device) and may be holding (and possibly operating) the handheld electronic device 102. Thus, when the user moves, e.g., changes location or orientation within the physical space, the HMD 100 (and possibly the handheld electronic device 102) will also change locations and/or orientations within the physical space, based on the movement of the user.

Figure 2A:
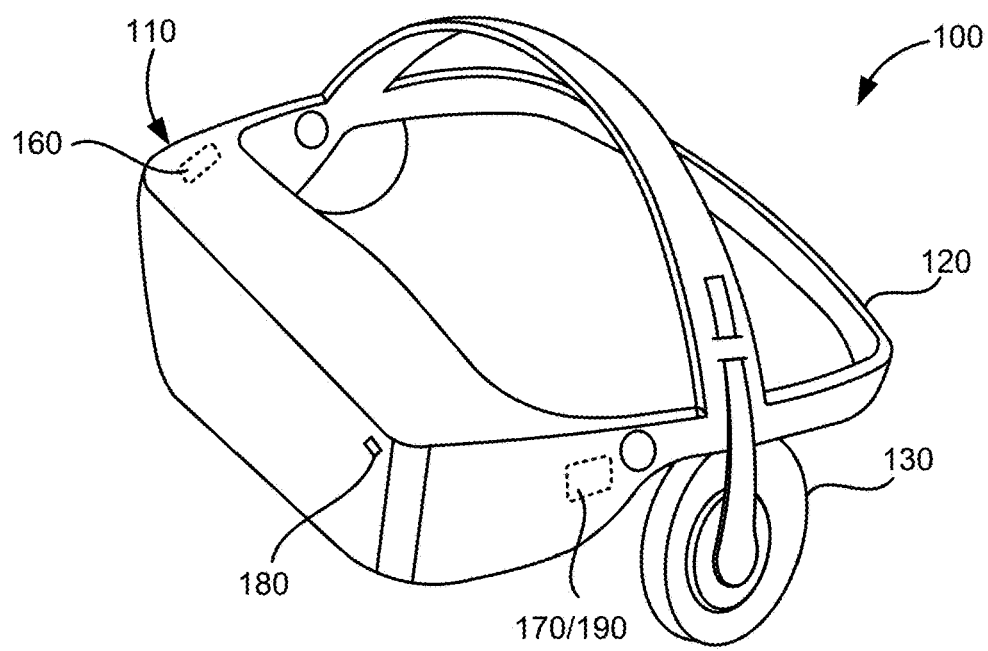
FIGS. 2A and 2B are perspective views of a head mounted display device, in accordance with an embodiment broadly described herein.
Figure 2B:
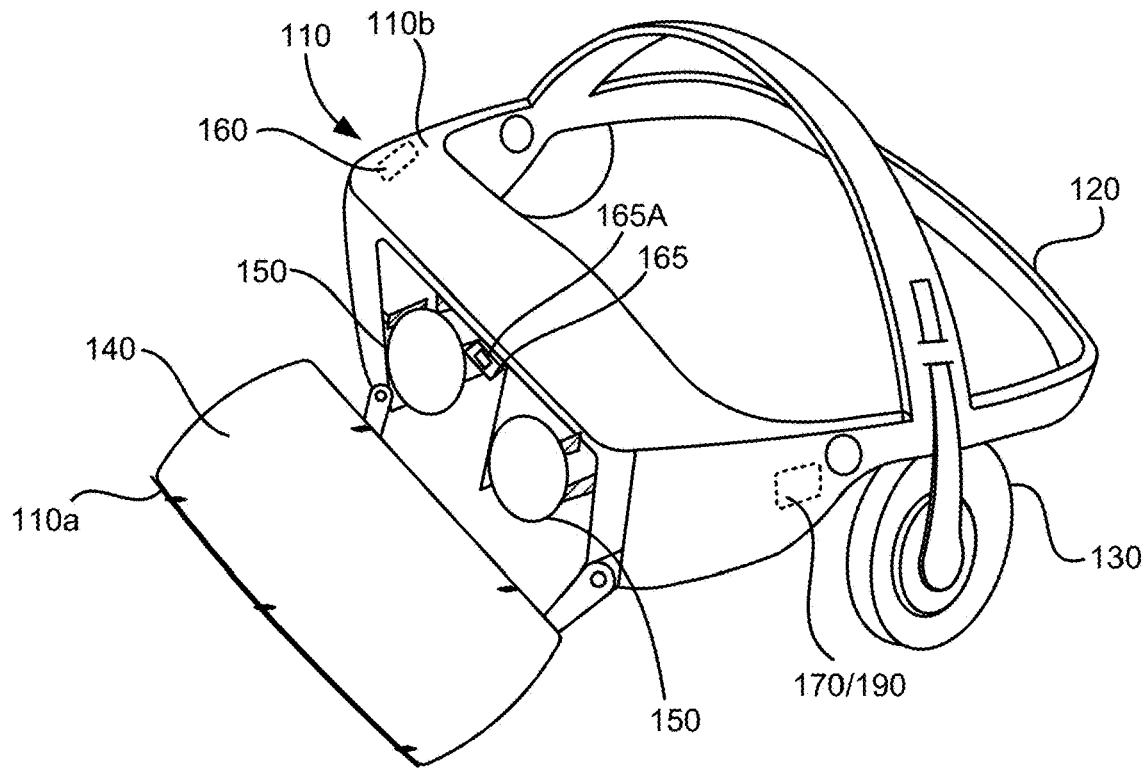

FIGS. 2A and 2B are perspective views of an example HMD, such as, for example, the HMD 100 worn by the user in FIG. 1, to generate an immersive virtual experience. The HMD 100 may include a housing 110 coupled, for example, rotatably coupled and/or removably attachable, to a frame 120. An audio output device 130 including, for example, speakers mounted in headphones, may also be coupled to the frame 120. In FIG. 2B, a front face 110a of the housing 110 is rotated away from a base portion 110b of the housing 110 so that some of the components received in the housing 110 are visible. A display 140 may be mounted on the front face 110a of the housing 110. Lenses 150 may be mounted in the housing 110, between the user's eyes and the display 140 when the front face 110a is in the closed position against the base portion 110b of the housing 110. A position of the lenses 150 may be may be aligned with respective optical axes of the user's eyes to provide a relatively wide field of view and relatively short focal length. In some embodiments, the HMD 100 may include a sensing system 160 including various sensors and a control system 170 including a processor 190 and various control system devices to facilitate operation of the HMD 100.

In some embodiments, the HMD 100 may include a camera 180 to capture still and moving images of the real world environment outside of the HMD 100. In some embodiments the images captured by the camera 180 may be displayed to the user on the display 140 in a pass through mode, allowing the user to temporarily view the real world without removing the HMD 100 or otherwise changing the configuration of the HMD 100 to move the housing 110 out of the line of sight of the user.

In some embodiments, the HMD 100 may include an optical tracking device 165 to detect and track user eye movement and activity. The optical tracking device 165 may include, for example, an image sensor 165A to capture images of the user's eyes, and in some embodiments, a particular portion of the user's eyes, such as, for example, the pupil. In some embodiments, the optical tracking device 165 may include multiple image sensors 165A positioned to detect and track user eye activity. In some embodiment, the optical tracking device 165 may detect and track optical gestures such as, for example eyelid movement associated with opening and/or closing of the user's eyes (e.g., closing for a threshold period of time and then opening, opening for a threshold period of time and then closing, closing and/or opening in particular pattern). In some embodiments, the optical tracking device 165 may detect and track an eye gaze direction and duration. In some embodiments, the HMD 100 may be configured so that the optical activity detected by the optical tracing device 165 is processed as a user input to be translated into a corresponding interaction in the immersive virtual world experience generated by the HMD 100.

Figure 3:
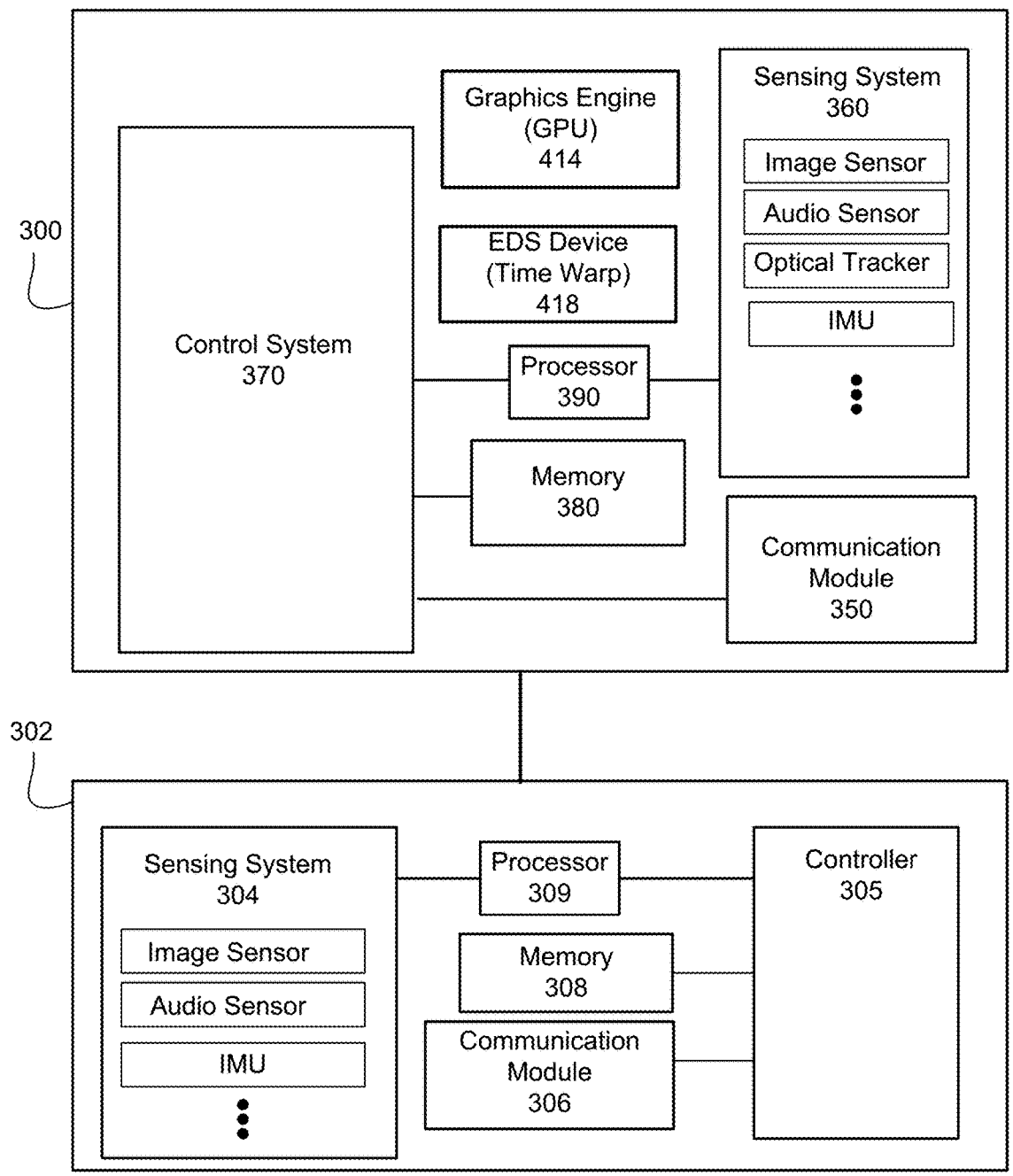
FIG. 3 is a block diagram of a virtual reality system, in accordance with an embodiment broadly described herein.

FIG. 3 is a block diagram of a virtual reality system, in accordance with an embodiment broadly described herein. The system may include a first user electronic device 300. In some embodiments, the first user electronic device 300 may be in communication with a second user electronic device 302. The first user electronic device 300 may be, for example an HMD as described above with respect to FIGS. 1, 2A and 2B, generating an immersive virtual immersive experience, and the second user electronic device 302 may be, for example, a handheld electronic device as described above with respect to FIG. 1, in communication with the first user electronic device 300 to facilitate user interaction with the virtual immersive experience generated by the HMD.

The first electronic device 300 may include a sensing system 360 and a control system 370, which may be similar to the sensing system 160 and the control system 170, respectively, shown in FIGS. 2A and 2B. The sensing system 360 may include numerous different types of sensors, including, for example, a light sensor, an audio sensor, an image sensor, a distance/proximity sensor, an inertial measurement system including for example and accelerometer and gyroscope, and/or other sensors and/or different combination(s) of sensors. In some embodiments, the light sensor, image sensor and audio sensor may be included in one component, such as, for example, a camera, such as the camera 180 of the HMD 100 shown in FIGS. 2A and 2B. In some embodiments, the sensing system 360 may include an image sensor positioned to detect and track optical activity of the user, such as, for example, a device similar to the optical tracking device 165 shown in FIG. 2B. The control system 370 may include numerous different types of devices, including, for example, a power/pause control device, audio and video control devices, an optical control device, a transition control device, and/or other such devices and/or different combination(s) of devices. In some embodiments, the sensing system 360 and/or the control system 370 may include more, or fewer, devices, depending on a particular embodiment. The elements included in the sensing system 360 and/or the control system 370 can have a different physical arrangement (e.g., different physical location) within, for example, an HMD other than the HMD 100 shown in FIGS. 2A and 2B.

According to an example implementation, sensing system 360 may detect an amount of rotation of a user's head/HMD 100 or a change in rotation of a user's head/HMD 100. According to an example implementation, an amount of rotational time-warping to be performed for a frame may be determined based on a change in rotation of a user's head/HMD 100. Sensing system 360 may also detect a location of a user's eyes and/or determine a translation or change in a location of a user's eyes. For example, a change in a location of a user's eyes may be determined based on (or as a) fixed offset(s) from the location of the HMD 100. Also, or alternatively, sensing system 360 may include an eye tracking device to track the location or change in location of a user's eyes. According to an example implementation, a change in a location of a user's eyes (e.g., either based on fixed offsets of the HMD location or based on detected eye location by an eye tracking device) may be used to determine an amount of positional time-warping to be performed for a frame.

The first electronic device 300 may also include a processor 390 in communication with the sensing system 360 and the control system 370, a memory 380 accessible by, for example, a module of the control system 370, and a communication module 350 providing for communication between the first electronic device 300 and another, external device, such as, for example, the second electronic device 302 paired to the first electronic device 300.

The second electronic device 302 may include a communication module 306 providing for communication between the second electronic device 302 and another, external device, such as, for example, the first electronic device 300 paired with the second electronic device 302. In addition to providing for the exchange of, for example, electronic data between the first electronic device 300 and the second electronic device 302, in some embodiments, the communication module 306 may also be configured to emit a ray or beam. The second electronic device 302 may include a sensing system 304 including, for example, an image sensor and an audio sensor, such as is included in, for example, a camera and microphone, an inertial measurement unit, a touch sensor such as is included in a touch sensitive surface of a handheld electronic device, and other such sensors and/or different combination(s) of sensors. A processor 309 may be in communication with the sensing system 304 and a controller 305 of the second electronic device 302, the controller 305 having access to a memory 308 and controlling overall operation of the second electronic device 302.

According to an example embodiment, in order to improve performance of time-warping in a VR system without adding significant latency, a subset of down-sampled depth values may be used to adjust or scale time-warping for a frame. As shown in FIG. 3, the first electronic device 300 (which may be an HMD) may include a graphics engine (e.g., graphics processing unit/GPU) 414 for performing various graphics operations, such as, for example, for rendering a frame, and also down-sampling depth values for each tile of a frame to obtain a subset of down-sampled depth values for the frame. First electronic display device 300 may also include an electronic display stabilization (EDS) device 418 for performing a depth-adjusted time-warping of a frame based on a change in a head pose for a user and one or more of the down-sampled depth values of the subset of down-sampled depth values. Graphics engine 414 and EDS device 418 are described in greater detail in FIG. 4 according to an example embodiment.

Figure 4:
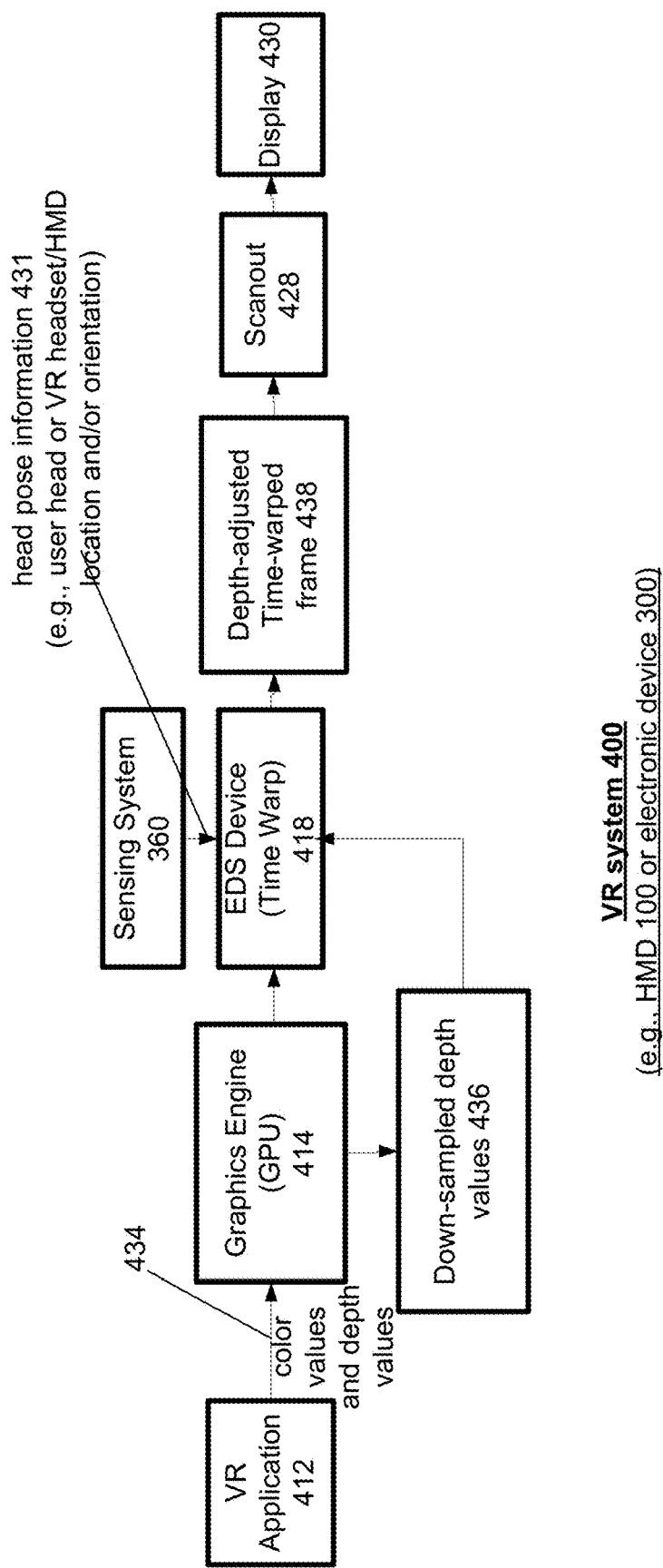
FIG. 4 is a block diagram illustrating a virtual reality (VR) system according to an example embodiment.

FIG. 4 is a block diagram illustrating a virtual reality (VR) system 400 according to an example embodiment. VR system 400 may be (or may include), for example, HMD 100 (FIG. 1) or first electronic device 300 (FIG. 3), by way of illustrative example, or other VR system. A virtual reality (VR) application 412 may generate and/or receive (via a network, for example) virtual reality content, including one or more frames. A color value and a depth value for each pixel of the frame may be received by a graphics engine (GPU) 414 via line 434, for example. Each depth value may indicate a relative depth for a pixel of the frame.

VR system 400 may include a sensing system 360 (e.g., which may be the same as sensing system 360, FIG. 3), e.g., for measuring and/or determining a pose of the user's head and/or pose of an HMD. Sensing system 360 may include, for example, an inertial measurement unit (IMU), accelerometers, optical detectors, cameras or other devices to detect or sense a pose (e.g., location and/or orientation) of the user's head or of an HMD 100, including an initial pose used by graphics engine 414 to render a frame, and an updated pose of the user's head/HMD 100 that may be used to perform time-warping of the frame. VR system 400 may include one or more graphics engines, such as graphics engine 414 (which may be a graphics processing unit/GPU), for rendering one or more frames of the virtual-reality content based on an initial head pose information for a user's head/HMD 100, for example. Graphics engine 414 may receive head pose information, at different points in time, from sensing system 360.

As noted, in some cases, while a graphics engine 414 or GPU is rendering a frame, a user's head/HMD 100 may move, causing the pose (e.g., location/orientation) information for the user's head/HMD 100 to change or be inaccurate by the time the frame is output to the display 430.

Therefore, according to an example embodiment, in order to compensate for the rotation and/or translation (e.g., change in location or position) of the user's head/HMD 100, an electronic display stabilization (EDS) engine 418 may perform time-warping on a frame(s) received from graphics engine 414 based on an updated head pose information (or based on a change in head pose information) received from sensing system 360. In order to improve time-warping performance, EDS device 418 may perform depth-adjusted time-warping of the received frame, wherein at least a portion of the time-warping for the frame is adjusted based on one or more depth values of a subset of down-sampled depth values for the frame. The depth-adjusted time-warped frame 438 is then provided to scanout block 428, where the frame is then output, or scanned out, to a display device 430 for display to the user. For example, EDS device 418 may trigger (or cause) display of the depth-adjusted time-warped frame upon generating the depth-adjusted time-warped frame 438.

Figure 5:
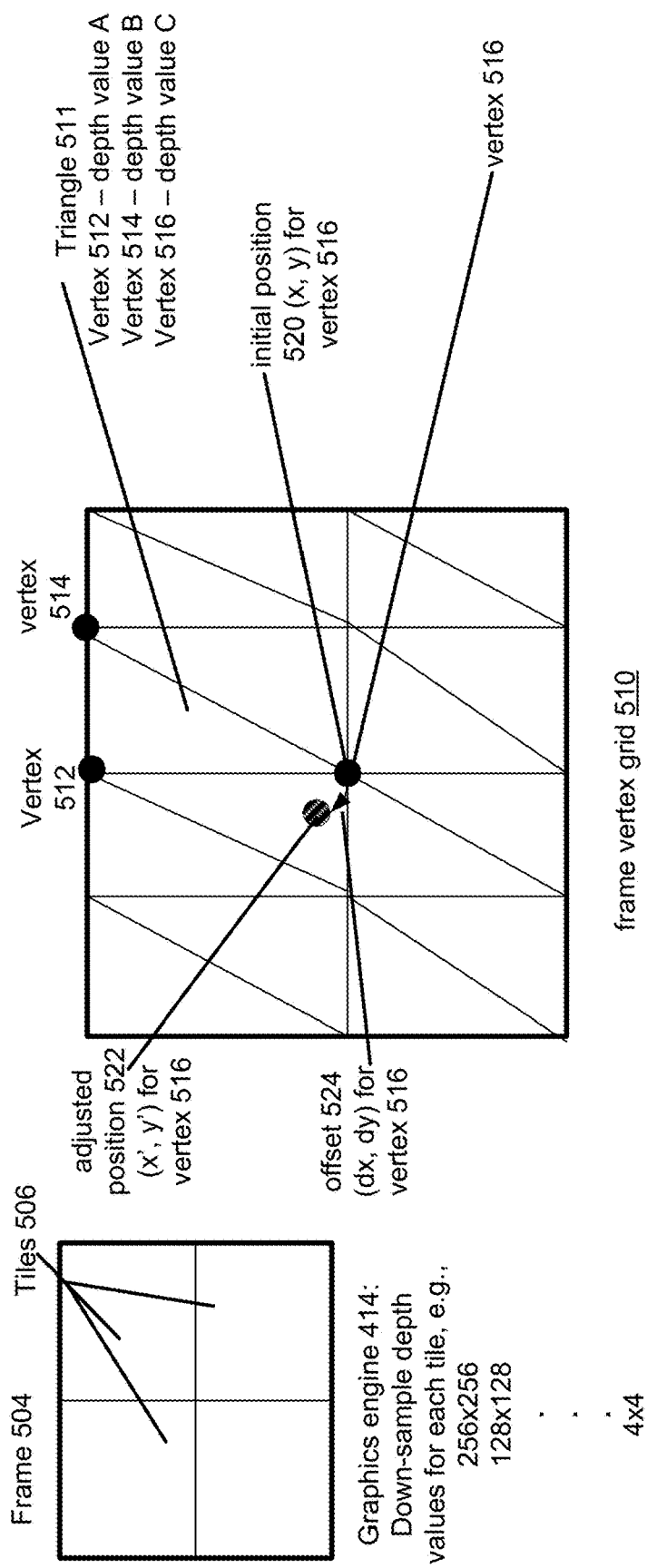
FIG. 5 is a diagram illustrating a frame vertex grid according to an example embodiment.

FIG. 5 is a diagram illustrating a frame vertex grid performing depth-adjusted time-warping according to an example embodiment. According to an example embodiment, the color values and depth values for a frame may be initially stored in a local memory (or GPU memory) for processing by the GPU/graphics engine 414. At least in some systems, in order to perform time-warping on the frame, the color and depth information may be written from local (GPU) memory to main memory so that time-warping on the frame may be performed by EDS device 418. However, there is typically a very limited bandwidth between the local (GPU) memory and the main memory. Therefore, it may add significant delay to write a large number of depth values for a frame out to a main memory for time-warp processing. Also, due to the limited processing power of EDS device 418, a significant latency or delay may be introduced into the time-warp processing at EDS 418 if a depth value for each pixel is processed to perform (e.g., per pixel) time-warping on the frame.

Therefore, according to an example embodiment, a frame 504, e.g., including a color value (e.g., R, G, B, alpha values) and a depth value for each pixel of the frame, may be received and stored in local (e.g., GPU) memory. The frame 504 may include a plurality of tiles 506 (or sections). Graphics engine 414 may, for example, down-sample the depth values for each tile 506 to obtain one or more down-sampled depth values for each tile. The size of the tile may be determined by VR application 412, for example, and may be rectangular, for example, or other shape or size. For example, as shown in FIG. 5, there may be, as an illustrative example, a tile of 256 pixels×256 pixels (256×256), with a depth value initially provided for each pixel. By way of illustrative example, graphics engine 414 may down-sample the 256×256 depth values to obtain a subset of down-sampled depth values. For example, graphics engine 414 may down-sample the 256×256 depth values to obtain 128×128 depth values, and then, after another down-sampling obtain 64×64 down-samples, until eventually there may be, e.g., 4×4 (e.g., 16) down-sampled depth values for each tile. Other techniques may be used as well to perform down-sampling. For example, The sizes of 256×256 (tile size), and 4×4 (size of a set of down-sampled depth values for each tile of a frame) are merely used as illustrative examples, and any sizes may be used. There are various ways in which down-sampling may be performed. For example, to down-sample 4 depth values (associated with 4 different pixels), the 4 depth values may be averaged to obtain one down-sampled depth value, by way of example. Alternatively, rather than averaging the depth values, a minimum depth value or a maximum depth value of a group of depth values may be selected to obtain a down-sampled depth value. After the subset of down-sampled depth values have been determined by graphics engine 414 and then written from local (GPU) memory to main memory, EDS device 418 may then perform depth-adjusted time-warping on the frame based on one or more of these down-sampled depth values. By using a subset of depth values from a frame, an effective depth-adjusted time-warping of a frame may be performed for a VR system, e.g., while decreasing or at least limiting the processing overhead and latency introduced due to processing of depth values for the time-warping of the frame.

Also, according to an example embodiment, a frame may be divided into a plurality of polygons (e.g., rectangles, triangles). For example, a graphics engine 414 may render each polygon of a frame (e.g., the frame rendered by polygon). For example, when rendering a tile, graphics engine 414 may render all polygons/triangles that intersect the tile. A frame vertex grid 510, as an example, may include a plurality of polygons and a plurality of vertexes. Locations of the vertexes may be determined by VR application 412, and may define triangles to be rendered by the graphics engine 414. The frame vertex grid 510 may also be provided for performing time-warping of a frame based on down-sampled depth values. The frame vertex grid 510 may represent a frame or a portion of a frame, e.g., with coordinates or locations shown for each polygon and vertex. In this example, the polygons are shown as triangles, but other types of polygons may be used.

In an example implementation, the depth values for each tile may be down-sampled to obtain a subset of down-sampled depth values for the frame, including one or more depth values per tile. Also, according to an example embodiment, a frame may be divided into a plurality of polygons (e.g., rectangles, triangles), where a down-sampled depth value may be determined for each vertex of one or more of the polygons for the frame. For example, a coordinate position (e.g., x, y coordinate) may be determined for the vertex. Then, the EDS device 418 may determine (or select), from the subset of down-sampled depth values, a down-sampled depth value that has a same (or overlapping, or nearest) coordinate location as the vertex, or based on interpolation of multiple nearby depth values (that are near the vertex).

As noted, only a subset of down-sampled depth values are provided or determined for a frame, e.g., for each tile of the frame, and then used for time-warping. One (or more) of these down-sampled depth values may be assigned to or determined for each vertex. According to an example implementation, rather than processing a separate depth value for each and every pixel of a frame to perform time-warping, VR system 400 may process the subset of down-sampled depth values, e.g., a depth value at/for each vertex, to perform a depth-adjusted time-warping of the frame. In this manner, a more effective and efficient depth-adjusted time-warping may be performed, e.g., which may reduce the computational load for such time-warping.

EDS 418 may determine an adjusted position for a vertex based on a change in head pose and a down-sampled depth value for the vertex. EDS device 418 may perform, based on at least an adjusted position of the vertex, a depth-adjusted time-warping of a frame, e.g., which may include, by way of illustrative example: using interpolation to determine adjusted positions of one or more pixels within a polygon.

According to an example embodiment, an adjusted position (e.g., x', y') for a vertex may be determined based on a change in a user's head pose and the down-sampled depth value for (or at) the vertex (or at the x,y coordinate of the vertex). For example, an adjusted position may be determined for a vertex, or for each vertex of a plurality (or group) of vertexes of a polygon. According to an example embodiment, in order to perform a depth-adjusted time-warping on the frame, an electronic display stabilization (EDS) device 418 may, for each of one or more polygons of the frame, determine an adjusted position for one or more pixels within the polygon by interpolating between adjusted positions of a group of vertexes of the polygon.

By way of illustrative example, referring again to the frame vertex grid 510 in FIG. 5, each triangle may include three vertexes (or vertices). For example, triangle 511 may include vertexes 512, 514 and 516. A vertex may be an intersection of two lines or sides of the polygon/triangle. The vertexes of a triangle define the triangle, for example. For example, graphics engine 414 may determine a down-sampled depth value A for vertex 512, a down-sampled depth value B for vertex 514, and a down-sampled depth value C for vertex 516, where A, B and C may, for example, be numbers or values indicating a depth or relative depth at or for the vertex. Each down-sampled depth value for a vertex may, for example, be a down-sampled depth value from one of the tiles 506. For example, a down-sample depth value may be selected or determined for a vertex where: the (e.g., x, y) coordinates or location of the down-sampled depth value within the tile or frame 504 matches (or most closely matches) or corresponds to or overlaps the location or coordinates of the vertex within the frame vertex grid 510. Alternatively, a depth value for a vertex may be calculated as an average or interpolation of two or more down-sampled depth values of a frame or tile.

The frame vertex grid 510 may, for example, reflect (or may be) the size and/or resolution of a display device (and/or coordinates or locations within the display device), and may allow the frame to be divided into a plurality of polygons or triangles. Each polygon or triangle within the frame vertex grid 510 may include a plurality of pixels to be displayed on a display device. Depth adjusted time-warping of the frame (e.g., including for the pixels of the frame) may include shifting or moving the position of each pixel of the frame to a new or adjusted position based on a change in head pose and depth information for the frame. Rather than using a depth value for each pixel to determine a depth-adjusted position of each pixel, the depth adjusted time-warping of the frame may be somewhat simplified by using a down-sampled depth value for a vertex (or for each of multiple vertexes). For example, a depth-adjusted time-warping of a frame may include: 1) determining an adjusted position (x', y') for a vertex (or for an x,y coordinate of the vertex) based on a change in head pose and the down-sampled depth value for the vertex/initial x,y frame coordinate of the vertex, and 2) performing (e.g., based on interpolation), based on the adjusted position (e.g., x', y'), or based on an x,y offset, for the vertex or for a plurality of the vertexes, a depth adjusted time-warping of the frame to obtain a depth-adjusted time-warped frame.

According to an example embodiment, a group (of one or more) of vertexes may be provided for each triangle or polygon. For example, as noted, vertexes 512, 514 and 516 are provided for triangle 511. For example, vertex 516 may be provided at an initial location/position of x,y (e.g., indicating position in a horizontal and vertical dimensions of the display), and then may be moved or shifted by an offset 524 (dx, dy) such that the vertex 516 is provided at an adjusted position (x', y').

According to an example embodiment, performing a depth-adjusted time-warping on the frame may include the EDS device 418 performing the following for each of one or more polygons/triangles: determining adjusted positions for pixels within the polygon by interpolating between adjusted positions of each vertex of a group of vertexes of the polygon. Or, for example, a change in a position for a pixel within a polygon may be determined by interpolating position changes (e.g., dx, dy) of vertexes of the polygon. Thus, computational complexity of depth-adjusted time-warping may be decreased (and thereby decrease latency) by using only a subset of down-sampled depth values to determine an adjusted position (e.g., adjusted coordinate, x', y') for each vertex based on a change in head pose and the down-sampled depth value for the vertex, and then interpolating the adjusted vertex positions/coordinates of a polygon/triangle to determine adjusted positions (or adjusted coordinates) of pixels within the polygon/triangle. In some example embodiments, interpolating between values can be performed very fast and inexpensively by a GPU/graphics engine 414 or by EDS device 418.

According to an example embodiment, an adjusted position (e.g., x', y') for each of a plurality of vertexes may be determined based on a change in head pose for a user or HMD and the down-sampled depth value for the vertex. For example, an electronic display stabilization (EDS) device 418 may determine, based on a transform matrix, an adjusted position (e.g., x', y') for each of the plurality of vertexes based on a change in the head pose of the user and an initial position (e.g., x, y) of each of the vertexes. The transform matrix and the adjusted position for a vertex may be adjusted based on the down-sampled depth value for the vertex (e.g., where a greater change in position is provided for a vertex having a lesser down-sampled depth value, and a lesser change in position is provided for a vertex having a greater down-sampled depth value). According to an example embodiment, the adjusted position for a vertex may be based on a position offset for the vertex, which may include a positional time-warp component that is scaled or adjusted based on a down-sampled depth value for the vertex. In an example embodiment, the adjusted position (adjusted x,y frame coordinate) for each of a plurality of the vertexes (or coordinates of the vertexes) may include an adjusted x, y position (e.g., x', y') based on an x, y offset (dx, dy) from an initial x, y position of the vertex.

According to an example implementation, the time-warping may include rotational time-warping due to rotation of a user's head, and positional time-warping due to translation (or change in location or position) of a user's head, wherein the positional time-warping is scaled or adjusted based on a depth value for one or more vertexes.

According to an example embodiment, determining an adjusted position for a vertex may actually mean or include that, for an x,y frame coordinate at the vertex, an adjusted x,y coordinate is determined. Rather than the vertexes changing position, an x,y frame coordinate initially (before time-warping) at the vertex may be shifted or adjusted to a new or adjusted x,y frame coordinate (which may be indicated as x', y'). Thus, according to an example embodiment, the vertexes may be stationary within a frame vertex grid 510, but an x,y coordinate/position at the vertex may move or shift by an x,y offset, to an updated or adjusted x,y frame coordinate/position (x',y'). For example, a frame vertex may be provided at an x,y frame coordinate. An adjusted (or updated) position of the x,y coordinate, based on a change in head pose and a down-sampled depth value at the x,y frame coordinate of the vertex may be determined as an x,y offset (dx, dy) from the x,y frame coordinate, to obtain an adjusted x,y frame coordinate (x', y'). Thus, for example, a pixel at the x,y frame coordinate (of the vertex) may be shifted by dx, dy (x, y offset) to an adjusted/update x,y frame coordinate, where the x,y offset for such pixel initially located at the vertex may be determined based on a change in head pose and a down-sampled depth value at the x,y frame coordinate of the vertex. Positions of intermediate pixels (pixels not located at a vertex) within the polygon may be determined based on interpolation, for example. Depth-adjusted time-warping may be performed, where an x,y offset may be determined for each pixel within the polygon by interpolating between x,y offsets for the x,y coordinates of the vertexes of the polygons. The position or x,y frame coordinate of a pixel within the polygon is then adjusted or shifted by the x,y offset for the pixel. Or alternatively, an adjusted x,y frame coordinate for each pixel within a polygon may be determined by interpolating between the adjusted x,y frame coordinates (or adjusted positions) of the vertex positions/coordinates.

According to an example embodiment, the vertexes may stay in the same position, and the x,y texture (frame) coordinates may be shifted. The vertex contains the expected (or initial) x,y coordinates into the frame (without time-warping). Then a transformation matrix shifts (by an x, y offset) the expected x,y coordinates based on the head rotation and position change. The position translation in the transformation matrix is adjusted based on the depth at that vertex. The result of the transform is an adjusted texture (frame) coordinate into the source frame for the vertex. Once an adjusted frame coordinate is obtained for each vertex, a texture (or frame) coordinate is then interpolated between the vertexes in the display frame grid 510, e.g., for each pixel within a polygon. An x,y offset may be determined for an x,y coordinate on the frame. The result is an adjusted coordinate for (or at) a vertex: x',y'=x+dx, y+dy (where dx,dy is the offset and x,y is the expected texture coordinate at a certain vertex). In an example embodiment, the offset may be applied by the matrix transform: [x',y']=matrix*[x, y], where the position translation and rotation is applied at the same time. The transform performed by the transform matrix is adjusted for each vertex based on the depth value at (or for) that vertex.

Figure 6:
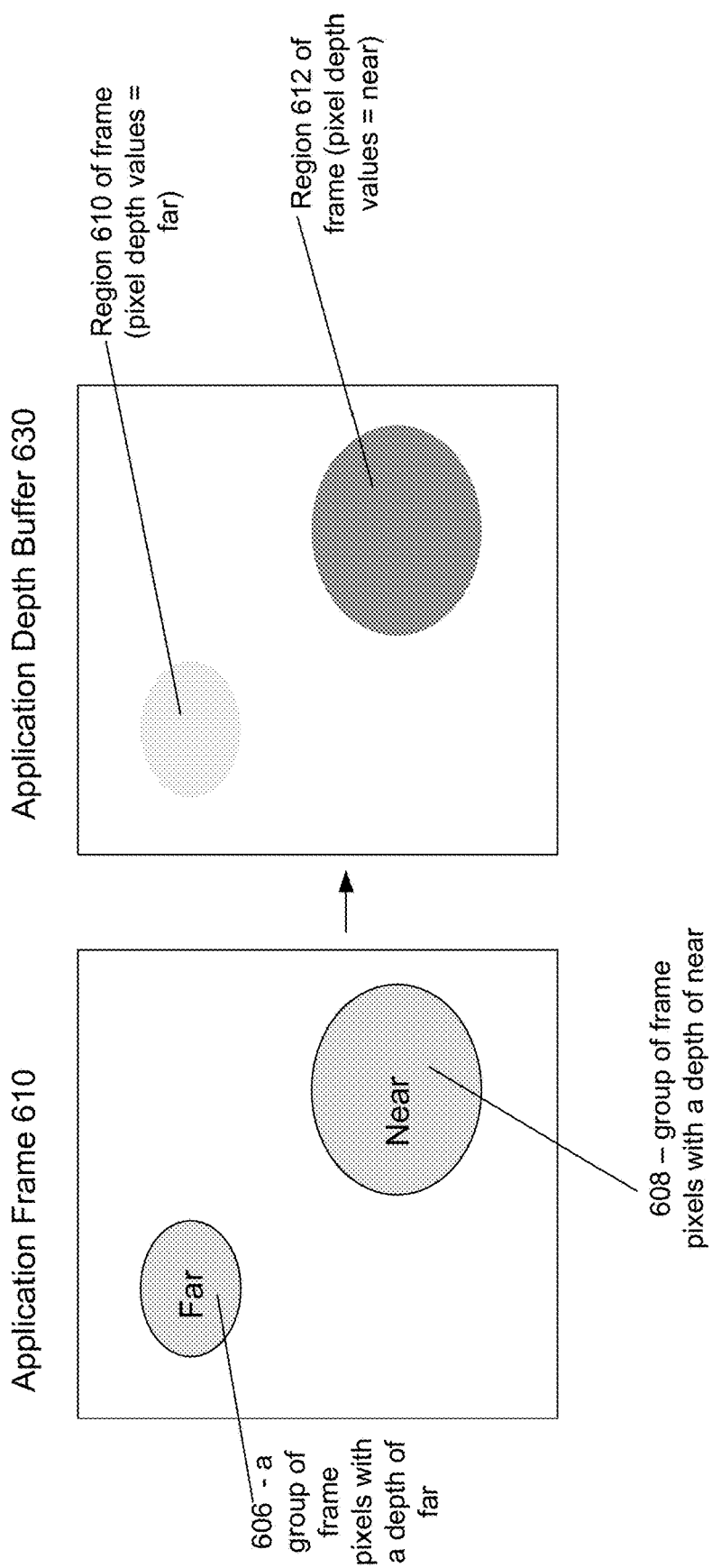
FIG. 6 is a diagram illustrating pixel depth values for a frame or tile according to an example embodiment.

FIG. 6 is a diagram illustrating pixel depth values for a frame or tile according to an example embodiment. Different objects (and thus different pixels) within a frame may have a different depth, such as a near depth, a medium depth, and a far depth, such as for a simple case where there are 3 example depth values. This is merely a simple example, and many depth values may be provided to distinguish between different depths. An application frame 610 may include a plurality of pixels, with a group of pixels 606 that may be provided at a far depth, while a group of pixels 608 that may be provided at a near (where near depth is closer or lower depth than far depth). An application depth buffer 630 may indicate a depth value for each pixel, including a depth value of far for each pixel within region 610, and a depth value of near for all pixels within region 612.

Figure 7:
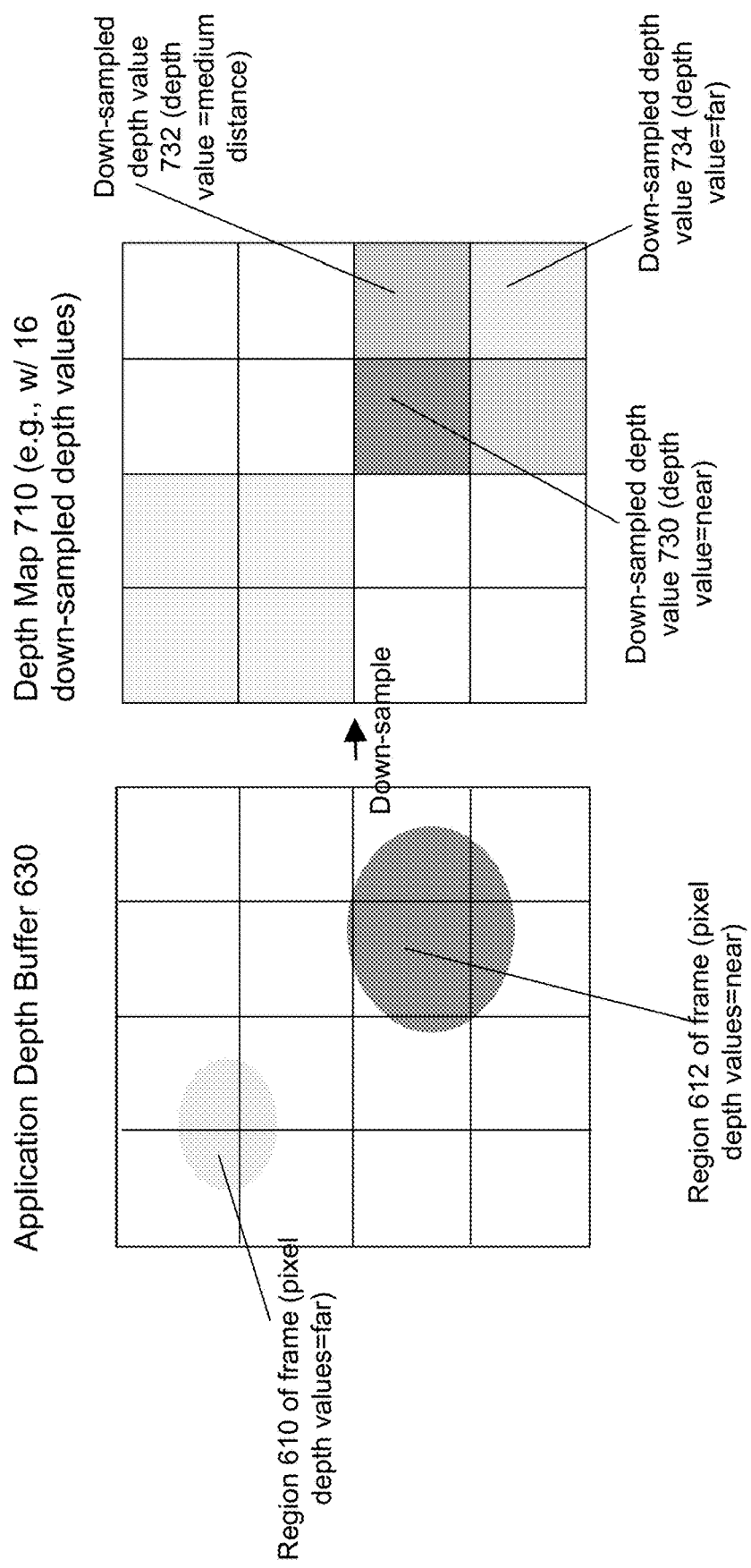
FIG. 7 is a diagram illustrating a down-sampling of pixel depth values to obtain a subset of down-sampled depth values for a tile or frame according to an example embodiment.

FIG. 7 is a diagram illustrating a down-sampling of pixel depth values to obtain a subset of down-sampled depth values for a tile or frame according to an example embodiment. An application depth buffer 630 is shown including region 610 that includes pixels with depth values=far, and a region 612 that includes pixels with depth values=near (by way of illustrative example). Graphics engine 414 may down-sample, per tile, or for each tile, the pixel depth values from application depth buffer 630, e.g., to obtain a group (e.g., 4×4) down-sampled depth values for the tile or frame. The depth map 710 indicates a depth value for each of the 16 down-sampled depth values for the tile or frame, e.g., where there is a 4×4 group of down-sampled depth values. For example, a down-sampled depth value 730 indicates a depth value=near; a down-sampled depth value 732 indicates a depth value=medium distance; and, a down-sampled depth value 734 indicates a depth value=far, as an illustrative example.

Figure 8:
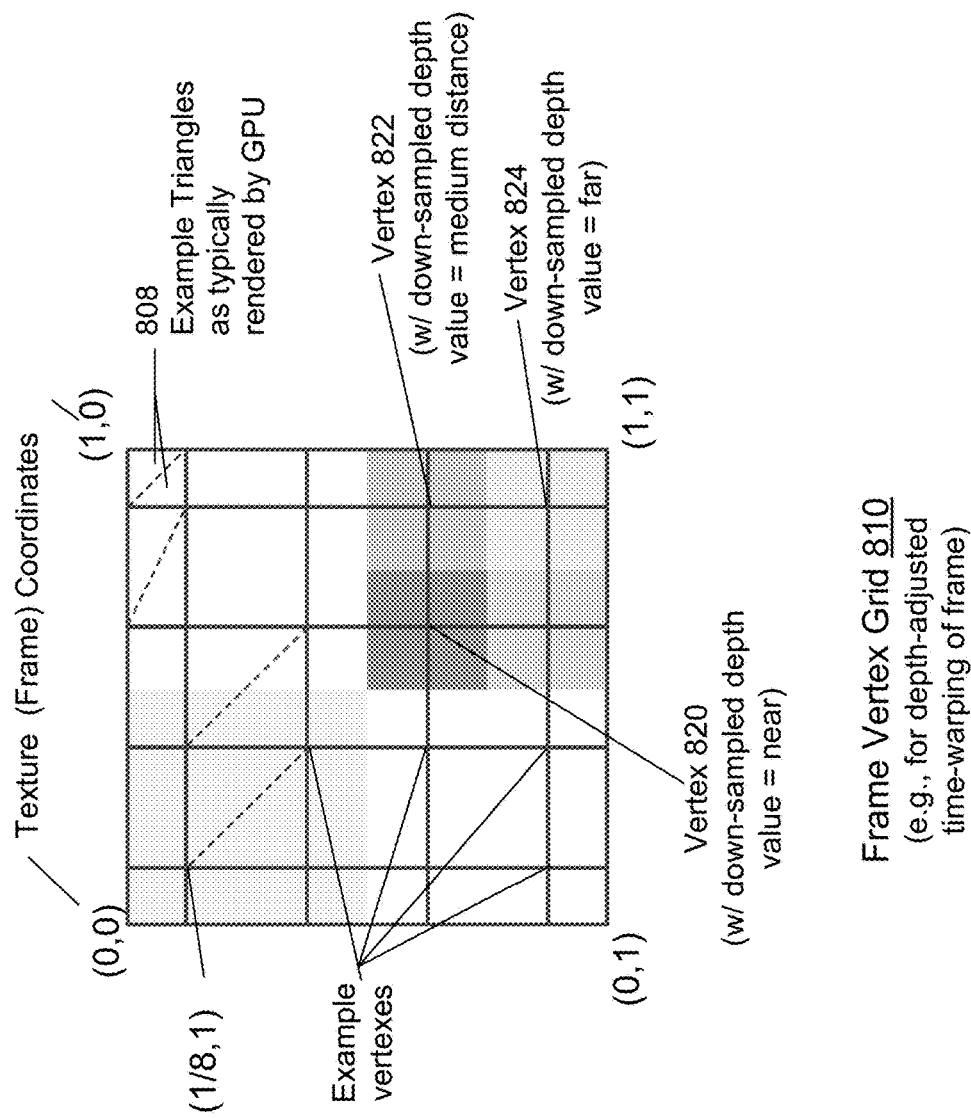
FIG. 8 is a diagram illustrating a frame vertex grid according to an example embodiment.

FIG. 8 is a diagram illustrating a frame vertex grid 810 according to an example embodiment. According to an example embodiment, frame vertex grid indicates a vertex at an intersection of a horizontal and vertical line, for a total of 36 vertexes (e.g., with 20 vertexes in the middle, and 20 more vertexes along the border of the frame vertex grid 810). Based on the depth map 710 (FIG. 7), vertex 820 may have a down-sampled depth value of near; vertex 822 may have a down-sampled depth value of medium; and vertex 824 may have a down-sampled depth value of far.

According to an example embodiment, as shown in FIG. 8, each quad or rectangle (or pixels within the quad or rectangle) within the frame vertex grid 810 may typically be rasterized as two triangles. For example, rasterizing may include a process of rendering a triangle or other geometric primitive to a discrete grid of pixels. One example quad or rectangle may be rasterized as the two triangles 808. Different coordinates (or coordinate locations or positions) are shown in the frame vertex grid 810, e.g., which may correspond to a coordinate or location on a display. For example, the upper left hand corner of the frame vertex grid may correspond to a (x,y) coordinate of (0,0), the upper right hand corner may correspond to a (x,y) coordinate of (1,0), the lower left hand corner may correspond to a (x,y) coordinate of (0,1), and the lower right hand corner may correspond to an (x,y) coordinate of (1,1). For example, to determine a down-sampled depth value for a vertex, the EDS device 418 may sample or read the down-sampled depth value for the coordinate/location of the vertex from depth map 710.

The following presents another illustrative example implementation:
P={x, y, depth}, where P is a pixel, a vertex, or other point of an image for display, at location {x, y, depth} in image space.
Pc=P transformed to camera space (Pc) based on the inverse of the projection matrix that was used to render the image.
Pc'=M*Pc, where M is the head pose change transformation matrix. Pc' is time-warped or reprojected location of point or pixel, in camera space.
P'=Pc' converted from camera space back to image space with the projection matrix that was used to render the image. P' is time-warped or reprojected location of point or pixel, in image space.

EXAMPLE 1

Figure 9:
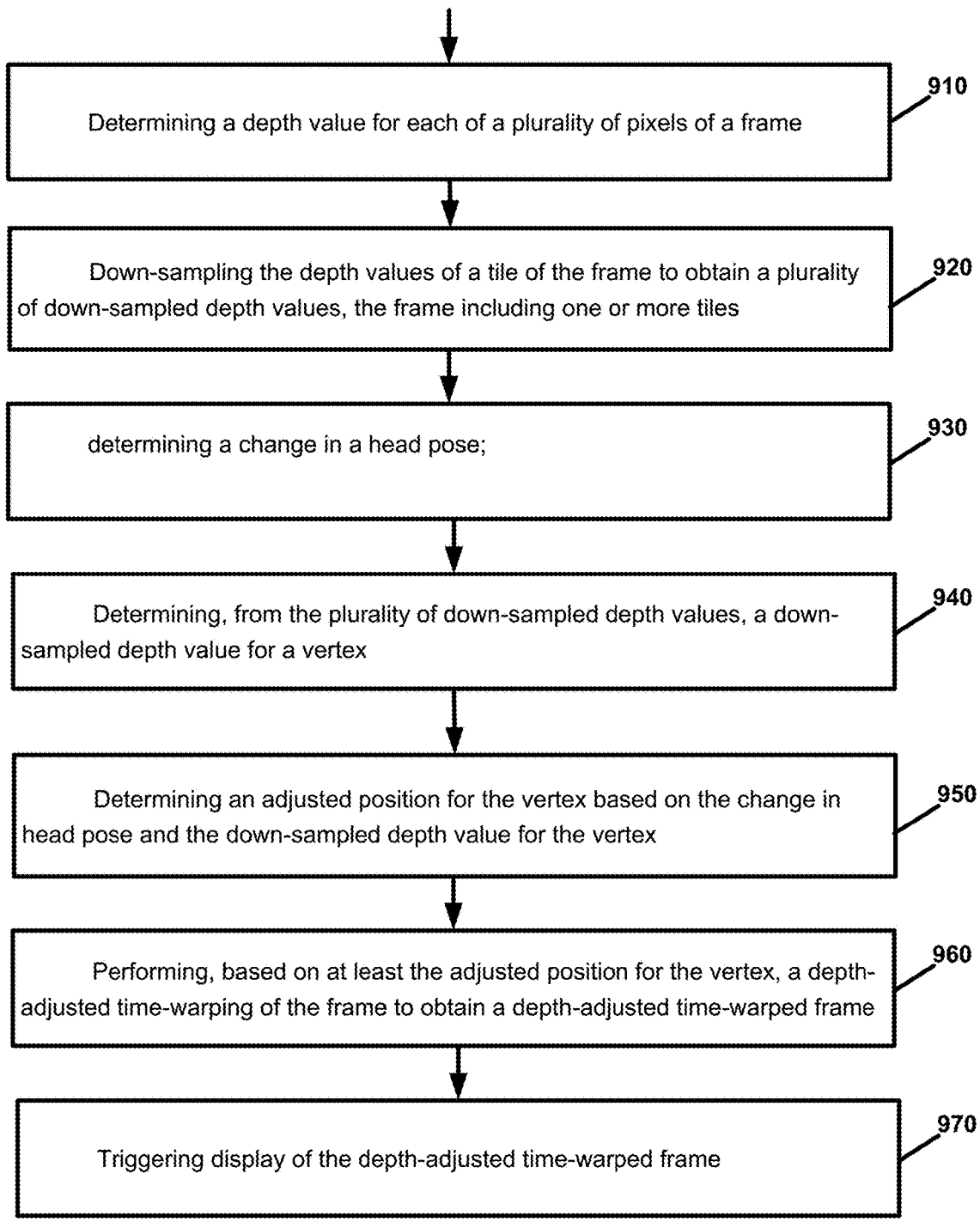
FIG. 9 is a flow chart illustrating operation of a virtual reality system according to an example embodiment.

FIG. 9 is a flow chart illustrating operation of a virtual reality system according to an example embodiment. The flow chart of FIG. 9 may be directed to a method of adjusting time-warping of a frame for a virtual reality system based on depth information. Operation 910 may include determining a depth value for each of a plurality of pixels of a frame. Operation 920 includes down-sampling the depth values of a tile of the frame to obtain a plurality of down-sampled depth values, the frame including one or more tiles. Operation 930 includes determining a change in a head pose. Operation 940 includes determining, from the plurality of down-sampled depth values, a down-sampled depth value for a vertex. Operation 950 includes determining an adjusted position for the vertex based on the change in head pose and the down-sampled depth value for the vertex. Operation 960 includes performing, based on at least the adjusted position for the vertex, a depth-adjusted time-warping of the frame to obtain a depth-adjusted time-warped frame. Operation 970 includes triggering display of the depth-adjusted time-warped frame.

EXAMPLE 2

According to an example embodiment of example 1, the determining, from the plurality of down-sampled depth values, a down-sampled depth value for a vertex may include: determining a coordinate location of the vertex; and determining, from the plurality of down-sampled depth values, a down-sampled depth value for the coordinate location as a down-sampled depth value for the vertex.

EXAMPLE 3

According to an example embodiment of any of examples 1-2, the determining, from the plurality of down-sampled depth values, a down-sampled depth value for a vertex may include: determining a first coordinate location of a first vertex; determining, from the plurality of down-sampled depth values, a first down-sampled depth value for the first coordinate location as a down-sampled depth value for the first vertex; determining a second coordinate location of a second vertex; and determining, from the plurality of down-sampled depth values, a second down-sampled depth value for the second coordinate location as a down-sampled depth value for the second vertex; wherein the determining an adjusted position for the vertex may include: determining an adjusted position for the first vertex based on the change in head pose and the first down-sampled depth value; and determining an adjusted position for the second vertex based on the change in head pose and the second down-sampled depth value.

EXAMPLE 4

According to an example embodiment of any of examples 1-3, the determining, from the plurality of depth values of the frame, a down-sampled depth value for a vertex may include determining a first down-sampled depth value for a first vertex and a second down-sampled depth value for a second vertex; wherein the determining an adjusted position for the vertex based on the change in head pose and the down-sampled depth value for the vertex may include: determining an adjusted position for the first vertex and an adjusted position of the second vertex based on the first down-sampled depth value and the second down-sampled depth value, respectively; and wherein the performing may include performing, based on at least the adjusted position for the first vertex and the adjusted position for the second vertex, a depth-adjusted time-warping of the frame to obtain a depth-adjusted time-warped frame.

EXAMPLE 5

According to an example embodiment of any of examples 1-4, the determining a change in a head pose may include: determining an initial head pose information; rendering the frame based on the color values of the plurality of pixels and the initial head pose information; determining, during or after the rendering, an updated head pose information, where a change in head pose is based on a difference between the updated head pose information and the initial head pose information.

EXAMPLE 6

According to an example embodiment of any of examples 1-5, down-sampling may include: determining a tile for the frame; and down-sampling the depth values of the tile to obtain one or more down-sampled depth values.

EXAMPLE 7

According to an example embodiment of any of examples 1-6, the time-warping may include rotational time-warping due to rotation of a user's head, and positional time-warping due to translation or change in location of a user's eyes, wherein the positional time-warping is scaled or adjusted based on a depth value for one or more of the vertexes.

EXAMPLE 8

According to an example embodiment of any of examples 1-7, the adjusted position for the vertex may be based on a position offset for the vertex, the position offset for the vertex including a positional time-warp component that is scaled or adjusted based on the down-sampled depth value for the vertex.

EXAMPLE 9

According to an example embodiment of any of examples 1-8, the adjusted position for the vertex may include an adjusted x, y position based on an x, y offset from an initial x, y position of the vertex.

EXAMPLE 10

According to an example embodiment of any of examples 1-9, the determining an adjusted position for the vertex may include: determining, based on a transform matrix, the adjusted position for the vertex based on a change in the head pose and an initial position of the vertex, wherein the transform matrix and the adjusted position for the vertex is adjusted based on the down-sampled depth value for the vertex.

EXAMPLE 11

According to an example embodiment of any of examples 1-10, the vertex includes a first vertex, wherein the first vertex and a second vertex are provided for a polygon within the frame, wherein an adjusted position is determined for each of the first vertex and the second vertex, and wherein the performing a depth-adjusted time-warping on the frame may include performing the following for the polygon: determining an adjusted positions for one or more pixels within the polygon by interpolating between an adjusted position of the first vertex and an adjusted position of the second vertex.

EXAMPLE 12

According to an example embodiment of any of examples 1-11, wherein the vertex is provided at an x,y frame coordinate, and wherein the adjusted position for the vertex comprises an adjusted x, y frame coordinate of the vertex based on an x, y offset, wherein the x,y offset is determined based on a change in head pose and a depth value at the x,y coordinate at the vertex.

EXAMPLE 13

According to an example embodiment of any of examples 1-12, the vertex may include a first vertex, wherein the first vertex and a second vertex are provided for a polygon within the frame, wherein the first vertex is provided at a first x,y frame coordinate, and wherein an adjusted position for the first vertex may include an first adjusted x, y frame coordinate of the first vertex based on a first x, y offset, wherein the first x,y offset is determined based on a change in head pose and a depth value of the first x,y coordinate; wherein the second vertex is provided at a second x,y frame coordinate, and wherein an adjusted position for the second vertex may include a second adjusted x, y frame coordinate of the second vertex based on a second x, y offset, wherein the second x,y offset is determined based on a change in head pose and a depth value of the depth x,y coordinate; and wherein the performing a depth-adjusted time-warping on the frame may include determining an x,y offset for one or more pixels within the polygon by interpolating between the first x,y offset of the first vertex and the second x,y offset of the second vertex.

EXAMPLE 14

According to an example embodiment of any of examples 1-13, the vertex may include a first vertex provided at a first x,y frame coordinate, wherein a second vertex is provided at a second x,y frame coordinate, the first vertex and the second vertex provided for a polygon; wherein an adjusted position for the first vertex may include a first adjusted x, y frame coordinate of the first vertex based on a first x, y offset that is determined based on a change in head pose and a depth value at the first x,y coordinate; wherein an adjusted position for the second vertex may include a second adjusted x, y frame coordinate of the second vertex based on a second x, y offset that is determined based on a change in head pose and a depth value at the second x,y coordinate; and wherein the performing a depth-adjusted time-warping on the frame may include: determining an x,y offset for a pixel within the polygon by interpolating between the first x,y offset of the first vertex and the second x,y offset of the second vertex; and adjusting a position of the pixel within the polygon based on the x,y offset for the pixel.

EXAMPLE 15

According to an example embodiment of any of examples 1-14, the vertex may include a first vertex, wherein the first vertex and a second vertex are provided for a polygon within the frame, wherein an adjusted position is determined for each of the first vertex and the second vertex, and wherein the performing a depth-adjusted time-warping on the frame may include performing the following for the polygon: determining adjusted positions for pixels within the polygon by interpolating between an adjusted position of the first vertex and an adjusted position of the second vertex.

EXAMPLE 16

According to an example embodiment of any of examples 1-15, and further including generating, by a head-mounted audio visual device, a virtual world immersive experience within a virtual space; and wherein the displaying may include: displaying, by the head-mounted audio visual device on a display device, the depth-adjusted time-warped frame.

EXAMPLE 17

According to an example embodiment, an apparatus includes at least one processor and at least one memory including computer instructions, when executed by the at least one processor, cause the apparatus to: determine a depth value for each of a plurality of pixels of a frame, down-sample the depth values of a tile of the frame to obtain a plurality of down-sampled depth values, the frame including one or more tiles, determine a change in a head pose, determine, from the plurality of down-sampled depth values, a down-sampled depth value for a vertex, determine an adjusted position for the vertex based on the change in head pose and the down-sampled depth value for the vertex, perform, based on at least the adjusted position for the vertex, a depth-adjusted time-warping of the frame to obtain a depth-adjusted time-warped frame, and trigger display of the depth-adjusted time-warped frame.

EXAMPLE 18

According to another example embodiment, a computer program product includes a computer-readable storage medium and storing executable code that, when executed by at least one data processing apparatus, is configured to cause the at least one data processing apparatus to perform a method including: determining a depth value for each of a plurality of pixels of a frame, down-sampling the depth values of a tile of the frame to obtain a plurality of down-sampled depth values, the frame including one or more tiles, determining a change in a head pose, determining, from the plurality of down-sampled depth values, a down-sampled depth value for a vertex, determining an adjusted position for the vertex based on the change in head pose and the down-sampled depth value for the vertex, performing, based on at least the adjusted position for the vertex, a depth-adjusted time-warping of the frame to obtain a depth-adjusted time-warped frame, and triggering display of the depth-adjusted time-warped frame.

EXAMPLE 19

According to an example embodiment, an apparatus includes means for performing the method of any of examples 1-16.

Embodiments of the various techniques described herein may be implemented in digital electronic circuitry, or in computer hardware, firmware, software, or in combinations of them. Embodiments may implemented as a computer program product, i.e., a computer program tangibly embodied in an information carrier, e.g., in a machine-readable storage device (computer-readable medium), for processing by, or to control the operation of, data processing apparatus, e.g., a programmable processor, a computer, or multiple computers. Thus, a computer-readable storage medium can be configured to store instructions that when executed cause a processor (e.g., a processor at a host device, a processor at a client device) to perform a process.

A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, embodiments may be implemented on a computer having a display device, e.g., a cathode ray tube (CRT), a light emitting diode (LED), or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments may be implemented in a computing system that includes a back-end component, e.g., as a data server, or that includes a middleware component, e.g., an application server, or that includes a front-end component, e.g., a client computer having a graphical user interface or a Web browser through which a user can interact with an embodiment, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

Figure 10:
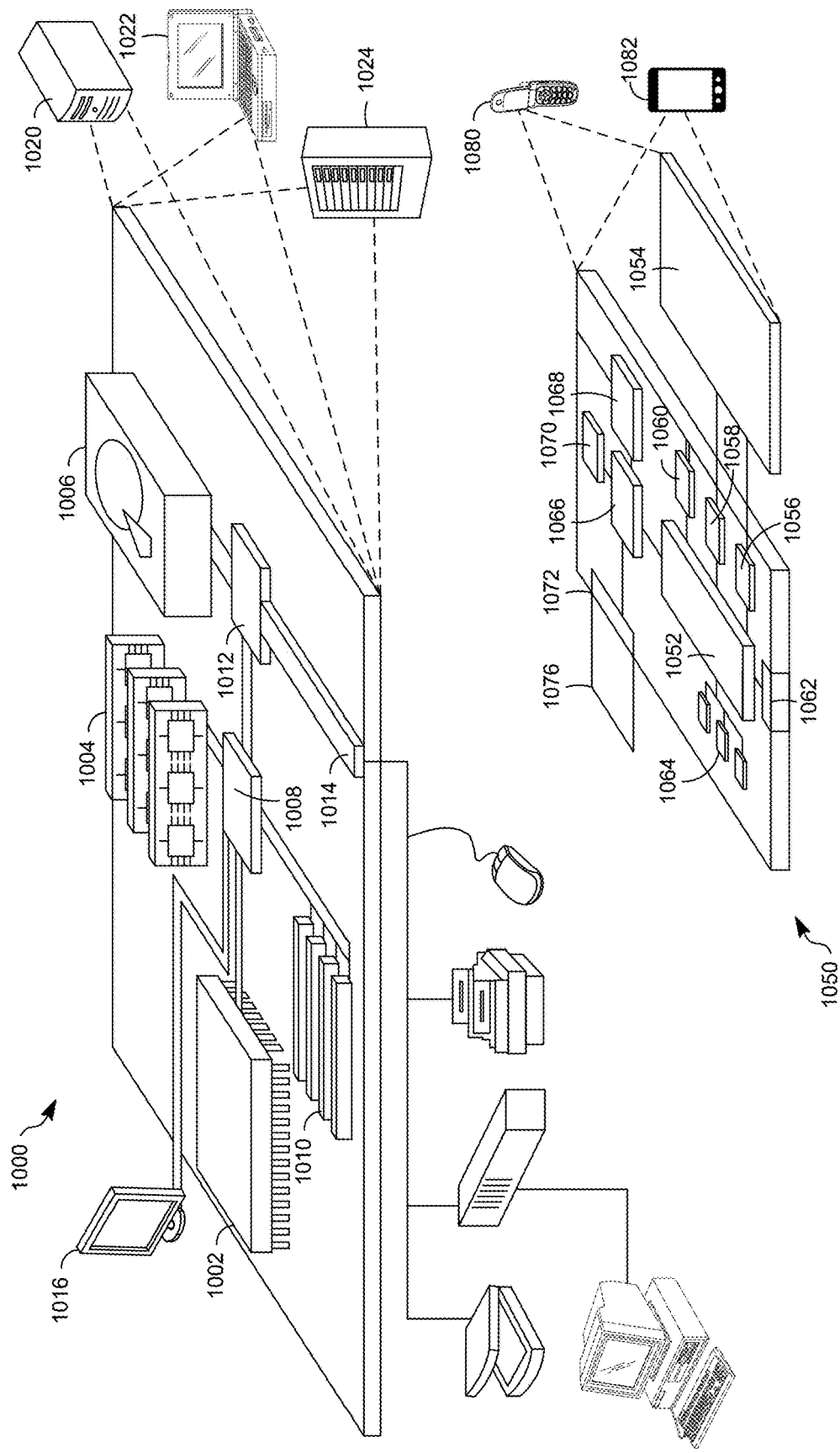
FIG. 10 illustrates an example of a computer device and a mobile computer device that can be used to implement the techniques described here.

FIG. 10 shows an example of a generic computer device 1000 and a generic mobile computer device 1050, which may be used with the techniques described here. Computing device 1000 is intended to represent various forms of digital computers, such as laptops, desktops, tablets, workstations, personal digital assistants, televisions, servers, blade servers, mainframes, and other appropriate computing devices. Computing device 1050 is intended to represent various forms of mobile devices, such as personal digital assistants, cellular telephones, smart phones, and other similar computing devices. The components shown here, their connections and relationships, and their functions, are meant to be exemplary only, and are not meant to limit embodiments of the inventions described and/or claimed in this document.

Computing device 1000 includes a processor 1002, memory 1004, a storage device 1006, a high-speed interface 1008 connecting to memory 1004 and high-speed expansion ports 1010, and a low speed interface 1012 connecting to low speed bus 1014 and storage device 1006. The processor 1002 can be a semiconductor-based processor. The memory 1004 can be a semiconductor-based memory. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high speed interface 1008. In other embodiments, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one embodiment, the memory 1004 is a volatile memory unit or units. In another embodiment, the memory 1004 is a non-volatile memory unit or units. The memory 1004 may also be another form of computer-readable medium, such as a magnetic or optical disk.

The storage device 1006 is capable of providing mass storage for the computing device 1000. In one embodiment, the storage device 1006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1004, the storage device 1006, or memory on processor 1002.

The high speed controller 1008 manages bandwidth-intensive operations for the computing device 1000, while the low speed controller 1012 manages lower bandwidth-intensive operations. Such allocation of functions is exemplary only. In one embodiment, the high-speed controller 1008 is coupled to memory 1004, display 1016 (e.g., through a graphics processor or accelerator), and to high-speed expansion ports 1010, which may accept various expansion cards (not shown). In the embodiment, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device (not shown), such as device 1050. Each of such devices may contain one or more of computing device 1000, 1050, and an entire system may be made up of multiple computing devices 1000, 1050 communicating with each other.

Computing device 1050 includes a processor 1052, memory 1064, an input/output device such as a display 1054, a communication interface 1066, and a transceiver 1068, among other components. The device 1050 may also be provided with a storage device, such as a microdrive or other device, to provide additional storage. Each of the components 1050, 1052, 1064, 1054, 1066, and 1068, are interconnected using various buses, and several of the components may be mounted on a common motherboard or in other manners as appropriate.

The processor 1052 can execute instructions within the computing device 1050, including instructions stored in the memory 1064. The processor may be implemented as a chipset of chips that include separate and multiple analog and digital processors. The processor may provide, for example, for coordination of the other components of the device 1050, such as control of user interfaces, applications run by device 1050, and wireless communication by device 1050.

Processor 1052 may communicate with a user through control interface 1058 and display interface 1056 coupled to a display 1054. The display 1054 may be, for example, a TFT LCD (Thin-Film-Transistor Liquid Crystal Display) or an OLED (Organic Light Emitting Diode) display, or other appropriate display technology. The display interface 1056 may comprise appropriate circuitry for driving the display 1054 to present graphical and other information to a user. The control interface 1058 may receive commands from a user and convert them for submission to the processor 1052. In addition, an external interface 1062 may be provide in communication with processor 1052, so as to enable near area communication of device 1050 with other devices. External interface 1062 may provide, for example, for wired communication in some embodiments, or for wireless communication in other embodiments, and multiple interfaces may also be used.

The memory 1064 stores information within the computing device 1050. The memory 1064 can be implemented as one or more of a computer-readable medium or media, a volatile memory unit or units, or a non-volatile memory unit or units. Expansion memory 1074 may also be provided and connected to device 1050 through expansion interface 1072, which may include, for example, a SIMM (Single In Line Memory Module) card interface. Such expansion memory 1074 may provide extra storage space for device 1050, or may also store applications or other information for device 1050. Specifically, expansion memory 1074 may include instructions to carry out or supplement the processes described above, and may include secure information also. Thus, for example, expansion memory 1074 may be provided as a security module for device 1050, and may be programmed with instructions that permit secure use of device 1050. In addition, secure applications may be provided via the SIMM cards, along with additional information, such as placing identifying information on the SIMM card in a non-hackable manner.

The memory may include, for example, flash memory and/or NVRAM memory, as discussed below. In one embodiment, a computer program product is tangibly embodied in an information carrier. The computer program product contains instructions that, when executed, perform one or more methods, such as those described above. The information carrier is a computer- or machine-readable medium, such as the memory 1064, expansion memory 1074, or memory on processor 1052, that may be received, for example, over transceiver 1068 or external interface 1062.

Device 1050 may communicate wirelessly through communication interface 1066, which may include digital signal processing circuitry where necessary. Communication interface 1066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1068. In addition, short-range communication may occur, such as using a Bluetooth, WiFi, or other such transceiver (not shown). In addition, GPS (Global Positioning System) receiver module 1070 may provide additional navigation- and location-related wireless data to device 1050, which may be used as appropriate by applications running on device 1050.

Device 1050 may also communicate audibly using audio codec 1060, which may receive spoken information from a user and convert it to usable digital information. Audio codec 1060 may likewise generate audible sound for a user, such as through a speaker, e.g., in a handset of device 1050. Such sound may include sound from voice telephone calls, may include recorded sound (e.g., voice messages, music files, etc.) and may also include sound generated by applications operating on device 1050.

The computing device 1050 may be implemented in a number of different forms, as shown in the figure. For example, it may be implemented as a cellular telephone 1080. It may also be implemented as part of a smart phone 1082, personal digital assistant, or other similar mobile device.

Various embodiments of the systems and techniques described here can be realized in digital electronic circuitry, integrated circuitry, specially designed ASICs (application specific integrated circuits), computer hardware, firmware, software, and/or combinations thereof. These various embodiments can include embodiment in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an embodiment of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, various modifications may be made without departing from the spirit and scope of embodiments as broadly described herein.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

While certain features of the described embodiments have been illustrated as described herein, many modifications, substitutions, changes and equivalents will now occur to those skilled in the art. It is, therefore, to be understood that the appended claims are intended to cover all such modifications and changes as fall within the scope of the embodiments. It should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. A method of adjusting time-warping of a frame for a virtual reality or augmented reality system based on depth information, the method including:
    rendering a frame having a plurality of pixels, the rendering including determining a depth value for each of the plurality of pixels of the frame, the frame being associated with a frame vertex grid that divides the frame into a plurality of polygons;
    down-sampling the depth values of the frame to obtain a plurality of down-sampled depth values;
    determining a change in a head pose;
    determining, from the plurality of down-sampled depth values, a down-sampled depth value for a vertex of the frame vertex grid;
    determining an adjusted position for the vertex of the frame vertex grid based on the change in head pose and the down-sampled depth value for the vertex of the frame vertex grid;
    performing, based on at least the adjusted position for the vertex of the frame vertex grid, a depth-adjusted time-warping of the frame to obtain a depth-adjusted time-warped frame; and
    triggering display of the depth-adjusted time-warped frame.

2. The method of claim 1,
wherein the determining, from the plurality of down-sampled depth values, a down-sampled depth value for a vertex comprises:
    determining a coordinate location of the vertex; and
    determining, from the plurality of down-sampled depth values, a down-sampled depth value for the coordinate location as a down-sampled depth value for the vertex.

3. The method of claim 1,
wherein the determining, from the plurality of down-sampled depth values, a down-sampled depth value for a vertex comprises:
    determining a first coordinate location of a first vertex;
    determining, from the plurality of down-sampled depth values, a first down-sampled depth value for the first coordinate location as a down-sampled depth value for the first vertex;
    determining a second coordinate location of a second vertex; and
    determining, from the plurality of down-sampled depth values, a second down-sampled depth value for the second coordinate location as a down-sampled depth value for the second vertex;
wherein the determining an adjusted position for the vertex comprises:
    determining an adjusted position for the first vertex based on the change in head pose and the first down-sampled depth value; and determining an adjusted position for the second vertex based on the change in head pose and the second down-sampled depth value.

4. The method of claim 1,
wherein the determining, from the plurality of depth values of the frame, a down-sampled depth value for a vertex comprises determining a first down-sampled depth value for a first vertex and a second down-sampled depth value for a second vertex;
wherein the determining an adjusted position for the vertex based on the change in head pose and the down-sampled depth value for the vertex comprises:
determining an adjusted position for the first vertex and an adjusted position of the second vertex based on the first down-sampled depth value and the second down-sampled depth value, respectively; and
wherein the performing comprises performing, based on at least the adjusted position for the first vertex and the adjusted position for the second vertex, a depth-adjusted time-warping of the frame to obtain a depth-adjusted time-warped frame.

5. The method of claim 1, wherein the determining a change in a head pose comprises:
determining an initial head pose information;
rendering the frame based on color values of the plurality of pixels and the initial head pose information; and
determining, during or after the rendering, an updated head pose information, where a change in head pose is based on a difference between the updated head pose information and the initial head pose information.

6. The method of claim 1, wherein down-sampling comprises:
determining a tile for the frame; and
down-sampling the depth values of the tile to obtain one or more down-sampled depth values.

7. The method of claim 1, wherein the time-warping comprises rotational time-warping due to rotation of a user's head, and positional time-warping due to translation or change in location of a user's eyes, wherein the positional time-warping is scaled or adjusted based on a depth value for one or more of the vertexes.

8. The method of claim 1, wherein the adjusted position for the vertex is based on a position offset for the vertex, the position offset for the vertex including a positional time-warp component that is scaled or adjusted based on the down-sampled depth value for the vertex.

9. The method of claim 1, wherein the adjusted position for the vertex comprises an adjusted x, y position based on an x, y offset from an initial x, y position of the vertex.

10. The method of claim 1, wherein the determining an adjusted position for the vertex comprises:
determining, based on a transform matrix, the adjusted position for the vertex based on a change in the head pose and an initial position of the vertex, wherein the transform matrix and the adjusted position for the vertex is adjusted based on the down-sampled depth value for the vertex.

11. The method of claim 1, wherein the vertex comprises a first vertex, wherein the first vertex and a second vertex are provided for a polygon within the frame, wherein an adjusted position is determined for each of the first vertex and the second vertex, and wherein the performing a depth-adjusted time-warping on the frame comprises performing the following for the polygon:
determining adjusted positions for pixels within the polygon by interpolating between an adjusted position of the first vertex and an adjusted position of the second vertex.

12. The method of claim 1,
wherein the vertex is provided at an x, y frame coordinate, and wherein the adjusted position for the vertex comprises an adjusted x, y frame coordinate of the vertex based on an x, y offset, wherein the x, y offset is determined based on a change in head pose and a depth value at the x, y coordinate at the vertex.

13. The method of claim 1, wherein the vertex comprises a first vertex, wherein the first vertex and a second vertex are provided for a polygon within the frame,
wherein the first vertex is provided at a first x, y frame coordinate, and wherein an adjusted position for the first vertex comprises a first adjusted x, y frame coordinate of the first vertex based on a first x, y offset, wherein the first x, y offset is determined based on a change in head pose and a depth value of the first x, y coordinate;
wherein the second vertex is provided at a second x, y frame coordinate, and wherein an adjusted position for the second vertex comprises a second adjusted x, y frame coordinate of the second vertex based on a second x, y offset, wherein the second x, y offset is determined based on a change in head pose and a depth value of the second x, y coordinate;
and wherein the performing a depth-adjusted time-warping on the frame comprises determining an x, y offset for one or more pixels within the polygon by interpolating between the first x, y offset of the first vertex and the second x, y offset of the second vertex.

14. The method of claim 1,
wherein the vertex comprises a first vertex provided at a first x, y frame coordinate, wherein a second vertex is provided at a second x, y frame coordinate, the first vertex and the second vertex provided for a polygon;
wherein an adjusted position for the first vertex comprises a first adjusted x, y frame coordinate of the first vertex based on a first x, y offset that is determined based on a change in head pose and a depth value at the first x, y coordinate;
wherein an adjusted position for the second vertex comprises a second adjusted x, y frame coordinate of the second vertex based on a second x, y offset that is determined based on the change in head pose and a depth value at the second x, y coordinate;
and wherein the performing a depth-adjusted time-warping on the frame comprises:
determining an x, y offset for a pixel within the polygon by interpolating between the first x, y offset of the first vertex and the second x, y offset of the second vertex; and
adjusting a position of the pixel within the polygon based on the x, y offset for the pixel.

15. The method of claim 1 wherein the method further comprises:
generating, by a head-mounted audio visual device, a virtual world immersive experience within a virtual space; and
wherein the displaying comprises:
displaying, by the head-mounted audio visual device on a display device, the depth-adjusted time-warped frame.

16. An apparatus comprising at least one processor and at least one memory including computer instructions that, when executed by the at least one processor, cause the apparatus to:
- render a frame having a plurality of pixels, the frame being associated with a frame vertex grid that divides the frame into a plurality of polygons;
- determine a depth value for each of the plurality of pixels of the frame;
- down-sample the depth values of the frame to obtain a plurality of down-sampled depth values;
- determine a change in a head pose;
- determine, from the plurality of down-sampled depth values, a down-sampled depth value for a vertex of the frame vertex grid;
- determine an adjusted position for the vertex of the frame vertex grid based on the change in head pose and the down-sampled depth value for the vertex of the frame vertex grid;
- perform, based on at least the adjusted position for the vertex of the frame vertex grid, a depth-adjusted time-warping of the frame to obtain a depth-adjusted time-warped frame; and
- trigger display of the depth-adjusted time-warped frame.

17. The apparatus of claim 16, wherein the instructions that cause the apparatus to determine a change in a head pose include instructions that cause the computing device to:
- determine an initial head pose information;
- render the frame based on color values of the plurality of pixels and the initial head pose information; and
- determine, during or after the rendering, an updated head pose information, where a change in head pose is based on a difference between the updated head pose information and the initial head pose information.

18. A computer program product, the computer program product comprising a computer-readable storage medium and storing executable code that, when executed by at least one data processing apparatus, is configured to cause the at least one data processing apparatus to perform a method comprising:
- rendering a frame having a plurality of pixels, the rendering including determining a depth value for each of the plurality of pixels of the frame, the frame being associated with a frame vertex grid that divides the frame into a plurality of polygons;
- down-sampling the depth values of the frame to obtain a plurality of down-sampled depth values;
- determining a change in a head pose;
- determining, from the plurality of down-sampled depth values, a down-sampled depth value for a vertex of the frame vertex grid;
- determining an adjusted position for the vertex of the frame vertex grid based on the change in head pose and the down-sampled depth value for the vertex of the frame vertex grid;
- performing, based on at least the adjusted position for the vertex of the frame vertex grid, a depth-adjusted time-warping of the frame to obtain a depth-adjusted time-warped frame; and
- triggering display of the depth-adjusted time-warped frame.

19. The computer program product of claim 18, wherein the determining a change in a head pose comprises:
- determining an initial head pose information;
- rendering the frame based on color values of the plurality of pixels and the initial head pose information; and
- determining, during or after the rendering, an updated head pose information, where a change in head pose is based on a difference between the updated head pose information and the initial head pose information.

20. The computer program product of claim 18, wherein the frame vertex grid includes a plurality of vertices defining the plurality of polygons and the performing the depth-adjusted time-warping of the frame to obtain a depth-adjusted time-warped frame includes performing the depth-adjusted time-warping based on depth-adjusted positions of the plurality of vertices of the frame vertex grid.

* * * * *